(12) United States Patent
Kim et al.

(10) Patent No.: US 11,747,715 B2
(45) Date of Patent: Sep. 5, 2023

(54) DUAL LENS DRIVING APPARATUS AND CAMERA MODULE

(71) Applicant: LG INNOTEK CO., LTD., Seoul (KR)

(72) Inventors: Jung Cheol Kim, Seoul (KR); Kyung Hwan Kim, Seoul (KR); Kap Jin Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 18/075,544

(22) Filed: Dec. 6, 2022

(65) Prior Publication Data

US 2023/0096844 A1 Mar. 30, 2023

Related U.S. Application Data

(63) Continuation of application No. 17/688,714, filed on Mar. 7, 2022, now Pat. No. 11,543,735, which is a (Continued)

(30) Foreign Application Priority Data

Mar. 30, 2017 (KR) .......................... 10-2017-0041107
Mar. 30, 2017 (KR) .......................... 10-2017-0041108
Mar. 30, 2017 (KR) .......................... 10-2017-0041109

(51) Int. Cl.
*G03B 13/36* (2021.01)
*G03B 5/02* (2021.01)
(Continued)

(52) U.S. Cl.
CPC .............. *G03B 13/36* (2013.01); *G03B 5/02* (2013.01); *G03B 17/12* (2013.01); *H04N 23/51* (2023.01);
(Continued)

(58) Field of Classification Search
CPC . G03B 13/36; G03B 5/02; G03B 5/00; G03B 17/12; G03B 11/04; G03B 19/07;
(Continued)

(56) References Cited

U.S. PATENT DOCUMENTS 5,303,089 A 4/1994 Ohno
8,295,695 B2 * 10/2012 Yoshida ................... G02B 7/08
396/133
(Continued)

FOREIGN PATENT DOCUMENTS

CN 1172263 A 2/1998
CN 102073191 A 5/2011
(Continued)

*Primary Examiner* — Pritham D Prabhakher
(74) *Attorney, Agent, or Firm* — Birch, Stewart, Kolasch & Birch, LLP

(57) ABSTRACT

A lens driving apparatus includes a housing; a bobbin; a coil disposed on the bobbin; a magnet facing the coil; a base disposed below the housing; a substrate disposed between the housing and the base; an elastic member disposed on the bobbin and coupled to the bobbin and the housing; and a support member coupled to the housing and the substrate. The elastic member includes an external part coupled to the housing, an internal part coupled to the bobbin, a connection part connecting the external part and the internal part. The bobbin includes a groove. The internal part of the elastic member includes a coupling hole. The coupling hole of the internal part includes a first area formed at a position corresponding to the groove, and a second area extending from the first area. An adhesive for fixing the elastic member to the bobbin is disposed in the coupling hole.

19 Claims, 16 Drawing Sheets

Related U.S. Application Data continuation of application No. 16/499,080, filed as application No. PCT/KR2018/002878 on Mar. 12, 2018, now Pat. No. 11,294,262.

(51) Int. Cl.
  *G03B 17/12* (2021.01)
  *H04N 23/51* (2023.01)
  *H04N 23/54* (2023.01)

(52) U.S. Cl.
  CPC ..... *H04N 23/54* (2023.01); *G03B 2205/0069* (2013.01); *G03B 2217/002* (2013.01)

(58) Field of Classification Search
  CPC ...... G03B 2217/002; G03B 2205/0069; H04N 5/2252; H04N 5/2253; H04N 5/23248; H04N 5/225; H04N 5/357; H04N 23/51; H04N 23/54; G02B 27/646; G02B 7/08; H01F 7/08; H01F 7/16; H01F 7/06
  USPC .......................................................... 348/345
  See application file for complete search history.

(56) References Cited

U.S. PATENT DOCUMENTS

| | | | | |
|---|---|---|---|---|
| 8,743,179 | B2* | 6/2014 | Ryu | G03B 30/00 348/46 |
| 8,792,782 | B1* | 7/2014 | Cheng | H02K 41/031 396/75 |
| 8,859,982 | B2* | 10/2014 | Jiang | H01J 37/063 250/423 F |
| 8,964,003 | B2* | 2/2015 | Oh | B29D 11/00807 156/182 |
| 9,143,664 | B2 | 9/2015 | Phoon et al. | |
| 9,494,769 | B2* | 11/2016 | Cheng | G02B 7/102 |
| 9,599,796 | B2 | 3/2017 | Shabtay et al. | |
| 9,632,279 | B2 | 4/2017 | Chen | |
| 9,915,802 | B2 | 3/2018 | Murakami et al. | |
| 9,921,388 | B2 | 3/2018 | Park et al. | |
| 9,933,628 | B2 | 4/2018 | Ariji | |
| 9,952,444 | B2* | 4/2018 | Kishine | G03B 5/00 |
| 9,958,701 | B2* | 5/2018 | Kishine | G02B 27/646 |
| 10,042,140 | B2 | 8/2018 | Park | |
| 10,054,799 | B2 | 8/2018 | Park et al. | |
| 10,078,196 | B2 | 9/2018 | Hwang et al. | |
| 10,114,229 | B2* | 10/2018 | Jung | H02K 41/0356 |
| 10,264,188 | B2 | 4/2019 | Miller et al. | |
| 10,468,959 | B2 | 11/2019 | Park et al. | |
| 10,509,194 | B2 | 12/2019 | Lee | |
| 2005/0046740 | A1 | 3/2005 | Davis | |
| 2010/0091120 | A1 | 4/2010 | Nagata et al. | |
| 2010/0277604 | A1 | 11/2010 | Sasaki et al. | |
| 2010/0314953 | A1 | 12/2010 | Gan et al. | |
| 2011/0044679 | A1 | 2/2011 | Yoshida et al. | |
| 2011/0097062 | A1 | 4/2011 | Tsuruta et al. | |
| 2011/0157367 | A1 | 6/2011 | Chang | |
| 2011/0169920 | A1 | 7/2011 | Ryu et al. | |
| 2012/0086784 | A1 | 4/2012 | Oh et al. | |
| 2012/0229926 | A1 | 9/2012 | Wade et al. | |
| 2013/0044382 | A1 | 2/2013 | Phoon et al. | |
| 2013/0141541 | A1 | 6/2013 | Jung et al. | |
| 2013/0242181 | A1 | 9/2013 | Phoon et al. | |
| 2014/0077077 | A1 | 3/2014 | Jiang et al. | |
| 2015/0070781 | A1 | 3/2015 | Cheng et al. | |
| 2015/0109422 | A1 | 4/2015 | Weiss | |
| 2015/0316745 | A1 | 11/2015 | Chen et al. | |
| 2016/0018720 | A1 | 1/2016 | Bachar et al. | |
| 2016/0025995 | A1 | 1/2016 | Ariji | |
| 2016/0085086 | A1 | 3/2016 | Rho et al. | |
| 2016/0131923 | A1 | 5/2016 | Hu et al. | |
| 2016/0187668 | A1* | 6/2016 | Hayashi | G02B 13/001 359/507 |
| 2016/0246029 | A1* | 8/2016 | Kim | G02B 7/08 |
| 2016/0299349 | A1* | 10/2016 | Cho | G03B 5/02 |
| 2016/0320585 | A1* | 11/2016 | Park | H04N 23/6812 |
| 2016/0341974 | A1* | 11/2016 | Kishine | B32B 37/12 |
| 2016/0349528 | A1* | 12/2016 | Kishine | G02B 13/0045 |
| 2016/0377881 | A1* | 12/2016 | Jung | H02K 41/0356 359/824 |
| 2017/0064172 | A1 | 3/2017 | Vittu | |
| 2017/0082823 | A1 | 3/2017 | Hwang et al. | |
| 2017/0082827 | A1* | 3/2017 | Park | H04N 23/687 |
| 2017/0094183 | A1 | 3/2017 | Miller et al. | |
| 2017/0094187 | A1* | 3/2017 | Sharma | G02B 7/09 |
| 2017/0115466 | A1 | 4/2017 | Murakami et al. | |
| 2017/0134628 | A1* | 5/2017 | Hwang | G03B 3/10 |
| 2017/0146773 | A1 | 5/2017 | Park | |
| 2017/0235094 | A1* | 8/2017 | Osaka | G02B 7/08 359/824 |
| 2017/0357144 | A1 | 12/2017 | Kim et al. | |
| 2018/0026515 | A1 | 1/2018 | Park et al. | |
| 2018/0275368 | A1 | 9/2018 | Lee | |
| 2019/0049691 | A1 | 2/2019 | Kudo et al. | |

FOREIGN PATENT DOCUMENTS

| | | |
|---|---|---|
| CN | 105187695 A | 12/2015 |
| CN | 105988181 A | 10/2016 |
| JP | 2015-232682 A | 12/2015 |
| KR | 10-2011-0078491 A | 7/2011 |
| KR | 10-2012-0050301 A | 5/2012 |
| KR | 10-2012-0068747 A | 6/2012 |
| KR | 10-2015-0009685 A | 1/2015 |
| KR | 10-2015-0054719 A | 5/2015 |
| KR | 10-2015-0055023 A | 5/2015 |
| KR | 10-2015-0113675 A | 10/2015 |
| KR | 10-2016-0005927 A | 1/2016 |
| KR | 10-2016-0008860 A | 1/2016 |
| KR | 10-2016-0012462 A | 2/2016 |
| KR | 10-2016-0045384 A | 4/2016 |
| KR | 10-2016-0049181 A | 5/2016 |
| KR | 10-2016-0103680 A | 9/2016 |
| KR | 10-2017-0016639 A | 2/2017 |
| WO | WO 2016/156996 A1 | 10/2016 |
| WO | WO 2016/208156 A1 | 12/2018 |

* cited by examiner

DUAL LENS DRIVING APPARATUS AND CAMERA MODULE

CROSS REFERENCE TO RELATED APPLICATIONS

This application is a Continuation of U.S. application Ser. No. 17/688,714, filed Mar. 7, 2022, which is a Continuation of U.S. application Ser. No. 16/499,080, filed Sep. 27, 2019 (now U.S. Pat. No. 11,294,262, issued on Apr. 5, 2022), which is the National Phase of PCT International Application No. PCT/KR2018/002878, filed on Mar. 12, 2018, which claims priority under 35 U.S.C. 119(a) to Patent Application No. 10-2017 0041107, filed in the Republic of Korea on Mar. 30, 2017, Patent Application No. 10 2017-0041108, filed in the Republic of Korea on Mar. 30, 2017, and Patent Application No. 10-2017-0041109, filed in the Republic of Korea on Mar. 30, 2017, all of which are hereby expressly incorporated by reference into the present application.

TECHNICAL FIELD

The teachings in accordance with exemplary and non-limiting embodiments of this invention relate generally to a dual lens driving apparatus and a camera module.

BACKGROUND ART

This section provides background information related to the present invention, which is not necessarily prior art.

Concomitant with generalization of wide use of various mobile terminals, and commercialization of wireless internet services, demands by consumers related to mobile terminals are also diversified to allow various types of peripheral devices to be mounted on the mobile terminals. A camera module is one of the representative items that capture a subject in a picture or a video. Meantime, recently, researches are being waged on dual camera modules in which two individual camera modules are adjacently disposed. However, when two individual camera modules are adjacently disposed, there arises a problem where magnet interference is mutually generated between two camera modules.

Moreover, the conventional dual camera modules suffer from disadvantages in that losses are generated on design and work processes due to increased number of terminals on substrates over those of single camera modules.

Furthermore, the conventional dual camera modules suffer from disadvantages in that resonance is generated on elastic members supporting the movement of bobbin and housing.

Still furthermore, the conventional dual camera modules suffer from disadvantages in that a magnet is disengaged from a housing in the reliable test processes.

DETAILED DESCRIPTION OF THE INVENTION

Technical Subject

The present exemplary embodiment is to provide a dual lens driving apparatus having a structure to overcome a mutual interference between magnets in a VCM structure for dual OIS.

Furthermore, the present exemplary embodiment is to provide a dual lens driving apparatus simplified in the number of terminals on a substrate.

Still furthermore, the present exemplary embodiment is to provide a dual lens driving apparatus configured to prevent the resonance phenomenon generated from elastic members.

Still furthermore, the present exemplary embodiment is to provide a dual lens driving apparatus having a structure where a magnet can be securely fixed n a housing.

Still furthermore, the present exemplary embodiment is to provide a camera module including the dual lens driving apparatus.

Technical Solution

The dual camera module according to an exemplary embodiment of the present invention is configured in such a manner that a plurality of magnets for driving a lens to X, Y and Z axes while encompassing each lens is fixed to a single housing, through which an AF (Auto Focus) operation to the Z axis direction can be independently driven for each lens, and an OIS operation to X axis or Y axis direction can be equally operated for two lenses.

Here, a dual lens driving apparatus according to an exemplary embodiment of the present invention comprises:
a housing;
a first bobbin disposed inside the housing to move to a first direction;
a second bobbin disposed inside the housing to move to the first direction and to be spaced apart from the first bobbin;
a first coil disposed on the first bobbin;
a second coil disposed on the second bobbin;
a magnet disposed on the housing to face the first coil and the second coil;
a base disposed below the housing;
a board (substrate) disposed between the housing and the base to include a circuit member having a third coil so disposed as to face the magnet; and
a support member movably supporting the housing with respect to the board, wherein the third coil includes a first axial coil moving the magnet to a second direction, and a second axial coil moving the magnet to a third direction, wherein the first axial coil includes four first axial coil units each spaced apart, wherein the four first axial coil units are mutually connected, and the second axial coil includes four second axial coil units each mutually spaced apart, and the four second axial coil units are mutually connected.

The dual lens driving apparatus may further comprise a sensor coupled to the board to detect the magnet, wherein the sensor includes a first axis sensor detecting movement of the magnet to the second direction and a second axis sensor detecting movement of the magnet to the third direction.

The board may include a terminal part connected to an outside power, wherein the terminal part may include 16 terminals, two terminals of the 16 terminals may be electrically connected to the first axis coil, two other terminals may be electrically connected to the second axis coil, four other terminals may be electrically connected to the first axis sensor, four other terminals may be electrically connected to the second axis sensor, two other terminals may be electrically connected to the first coil, and two remaining terminals may be electrically connected to the second coil.

The dual lens driving apparatus may further comprise:
a first upper elastic member disposed at an upper surface of first bobbin to be coupled with the first bobbin and the housing; and a second upper elastic member disposed at an upper surface of second bobbin to be coupled with the second bobbin and the housing, wherein the support member may include a first support member connected to the first upper elastic member and the board, and a second support member connected to the second upper elastic member and the board.

The first support member may include a first wire and a second wire, each spaced apart from the other, the second support member may include a third wire and a fourth wire, each spaced apart from the other, the first upper elastic member may include a first upper elastic unit and a second upper elastic unit, each spaced apart from the other, and connected to the first coil, the second upper elastic member may include a third upper elastic unit and a fourth upper elastic unit, each spaced apart from the other, and connected to the second coil, the first wire may be connected to the first upper elastic unit, the second wire may be connected to the second upper elastic unit, the third wire may be connected to the third upper elastic unit, and the fourth wire may be connected to the fourth upper elastic unit.

The eight terminals among the 16 terminals may be extended from a first lateral surface of board, and the remaining eight terminals may be extended from a second lateral surface opposite to the first lateral surface.

The magnet may include eight magnets respectively disposed at an area corresponding to each of the said four first axis coil units and the said four second axis coil units, wherein the eight magnets may be disposed at corners of housing.

The second direction may be perpendicular to the third direction and each of the second direction and the third direction may be perpendicular to the first direction.

The third coil may be formed with a FP (Fine Pattern) coil disposed on the circuit member.

A dual camera module according to an exemplary embodiment may comprise:
a PCB (Printed Circuit Board);
an image sensor disposed on the PCB;
a housing disposed on the PCB;
a first bobbin disposed inside the housing to move to a first direction;
a second bobbin disposed inside the housing to move to the first direction and spaced apart from the first bobbin;
a first coil disposed on the first bobbin;
a second coil disposed on the second bobbin;
a magnet disposed on the housing to face the first coil and the second coil;
a base disposed below the housing;
a board (substrate) including a circuit member having a third coil so disposed as to face the magnet between the housing and the base; and
a support member movably supporting the housing relative to the board, wherein the third coil may include a first axis coil moving the magnet to a second direction, and a second axis coil moving the magnet to a third direction, and each of the first axis coil and the second axis coil may be integrally formed.

A dual lens driving apparatus according to an exemplary embodiment of the present invention may comprise:
a housing;
a first bobbin disposed inside the housing;
a second bobbin disposed inside the housing to be spaced apart from the first bobbin;
a first coil disposed on the first bobbin;
a second coil disposed on the second bobbin;
a magnet disposed on the housing to face the first coil and the second coil;
a base disposed below the housing;
a substrate (board) including a third coil so disposed as to face the magnet between the housing and the base;
a first upper elastic member disposed on an upper surface of first bobbin to be coupled with the first bobbin and the housing;
a support member coupled with the first upper elastic member and the board; and
a damper disposed on the first upper elastic member, wherein the first upper elastic member includes an external part coupled with the housing, an internal part coupled with the bobbin, a connection part connecting the external part and the internal part, a coupling part extended from the external part to be coupled with the support member, and a first extension part extended from the coupling part to be spaced apart from the external part, and wherein the damper may connect the first extension part and the external part.

The first upper elastic member may further include a second extension part extended from the external part to a side of corner of the housing to be coupled with the coupling part, and the first extension part may be extended from the coupling part to a center direction of the first upper elastic member.

The first extension part may include an area having a width widened toward the center direction of the first upper elastic member.

The first extension part may be extended to the second extension part through the coupling part and may include an area having a curvature.

An area facing an internal part of the first extension part in a lateral surface of an external part may include a shape corresponding to that of an internal part of the first extension part.

The internal part of the first extension part may include an area having a curvature.

The housing may include a recessed part formed by allowing a portion of an upper surface of housing to be recessed, the portion of the recessed part may be overlapped with the coupling par to an optical axis direction, and the recessed part may be spaced apart from the coupling part.

The support member may include a wire, and a lower end of the wire may be soldered to a lower surface of substrate, and an upper end of the wire may be soldered to the coupling part.

The housing, the base and the substrate may be integrally formed.

A camera module according to an exemplary embodiment of the present invention may comprise:
a PCB;
an image sensor disposed on the PCB;
a housing disposed on an upper side of the PCB;
a bobbin disposed inside of the housing in order to move to a first direction;
a first coil disposed on the bobbin;
a magnet disposed on the housing to face the first coil;
a base interposed between the housing and the PCB;
a substrate (board) including a second coil between the housing and the base to face the magnet;
an upper elastic member disposed on an upper side of bobbin to be coupled to the bobbin and the housing;
a support member coupled to the upper elastic member and the substrate; and
a damper disposed on the upper elastic member, wherein the upper elastic member includes an external part coupled to the housing, an internal part coupled to the bobbin, a connection part connecting the external part and the internal part, a coupling part extended from the external part to be coupled with the support member, and a first extension part extended from the coupling part to be spaced apart from the external part, wherein the damper may be integrally disposed on the first extension part and the external part.

A dual camera module according to an exemplary embodiment of the present invention may fix, to one housing, a plurality of magnets wrapping each lens to drive the lens to X, Y, Z axes, through which an AF (Auto Focus) operation to the Z axis direction enables each lens to independently drive and an OIS operation to X axis direction or to Y axis direction may be equally exercised on two lenses.

A dual lens driving apparatus according to an exemplary embodiment of the present invention may comprise:
 a housing;
 a first bobbin disposed inside the bobbin;
 a second bobbin disposed inside the housing to be spaced apart from the first bobbin;
 a first coil disponed on the first bobbin;
 a second coil disposed on the second bobbin;
 a magnet disposed on the housing to face the second coil;
 a base disposed below the housing;
 a substrate (board) including a third coil disposed between the housing and the base to face the magnet; and
 a support member movably supporting the housing with respect to the substrate, wherein the housing may include a connection part interposed between the first bobbin and the second bobbin, and a hole extended from a lateral surface or a lower surface of the housing to at least one surface of the magnet to allow at least a portion to be disposed on the connection part.

The hole may include a first hole extended from a lateral surface of the housing to a portion of a first lateral surface of the magnet.

The hole may further include a second hole extended from a lower surface of the connection part at the housing to a portion of a second lateral surface of the magnet.

The hole may include a first passage extended with a predetermined shape from a lower surface of the connection part to an upper side, and a second passage connected to the first passage and extended to a horizontal direction.

The first hole and the second hole may be spaced apart from the other.

At least one of the first hole and the second hole may be disposed with an adhesive coupling the magnet to the housing.

The magnet may include a first magnet disposed on a side of the first bobbin and a second magnet disposed on a side of the second bobbin, and the first hole may include a first hole part extended from a lateral surface of the connection part to a first lateral surface of the first magnet and a second hole extended from a lateral surface of the connection part to a first lateral surface of the second magnet.

The housing may include an area where four side parts mutually meet and eight corner parts formed at an area where the side parts and the connection part meet, wherein the magnet may include a corner magnet each disposed on the eight corner parts of the housing, at least four surfaces of the corner magnet may be coupled to the housing by an adhesive, and the housing may further include a hole disposed at an area corresponding to a portion of an upper surface of the corner magnet to accommodate an adhesive.

A camera module according to an exemplary embodiment of the present invention may comprise:
 a PCB;
 an image sensor disposed on the PCB;
 a housing disposed on an upper side of the PCB;
 a first bobbin disposed at an inside of the housing to be moved to a first direction;
 a second bobbin disposed at an inside of the housing to be moved to the first direction and spaced apart from the first bobbin;
 a first coil disposed on the first bobbin;'
 a second coil disposed on the second bobbin;
 a magnet disposed on the housing to face the first coil and the second coil;
 a base disposed below the housing;
 a substrate (board) including a third coil interposed between the housing and the base to face the magnet; and
 a support member movably supporting the housing with respect to the housing, wherein
 the housing may include a connection part interposed between the first bobbin and the second bobbin, a first hole extended from a lateral surface of the connection part to allow a portion of a first lateral surface of the magnet to be exposed, and a second hole extended from a lower surface of the connection part to allow a portion of a second lateral surface of the magnet to be exposed.

Advantageous Effects

A mutual interference among magnets in a VCM structure for a dual OIS can be prevented through the present exemplary embodiment.

A VCM for dual OIS can be driven by a total of 16 terminals through the present exemplary embodiment.

A resonance phenomenon generated from an elastic member can be prevented through the present exemplary embodiment.

A phenomenon of a magnet being disengaged from a housing can be prevented even during a drop of a camera module through the present exemplary embodiment.

BEST MODE

Figure 1:
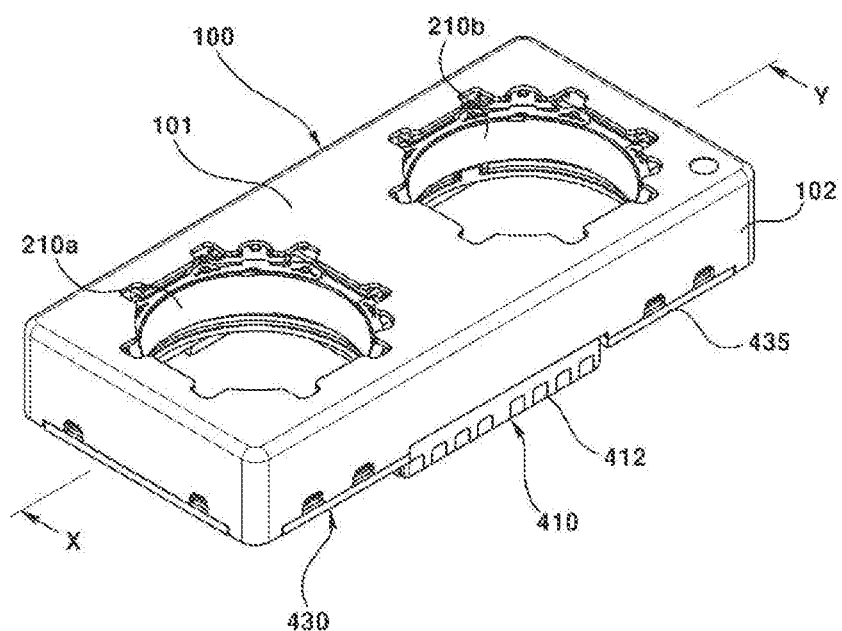
FIG. 1 is a perspective view of a dual lens driving apparatus according to an exemplary embodiment of the present invention.

Some exemplary embodiments of present invention will be described in detail with reference to the accompanying drawings. In describing a reference numeral for each element, a same reference numeral will be designated, if possible, for the same element, albeit being differently indicated on other drawings.

In describing elements in the exemplary embodiments of the present invention, the terms of first, second, A, B (a), (b), etc., may be used. These terms may be used only to distinguish one element from another element, and the nature, order or sequence is not restricted by these terms. When an element is referred to as being "accessed to", "coupled to," or "connected to," another element, it should be appreciated that the element may be directly accessed, connected or coupled to the other element, or intervening elements may be present therebetween.

The hereinafter-used term of "optical axis direction" may be defined as an optical axis direction of a lens module coupled to a lens drive device. Meantime, the "optical axis direction" may be interchangeably used with a vertical direction, a z axis direction and other directions.

The term of 'auto focus function' used hereinafter may be defined as a function of automatically matching a focus of a subject by adjusting a distance to an image sensor by moving a lens module to an optical axis direction according to a distance to the subject in order to obtain a clear image of the subject from an image sensor. Meantime, the "auto focus" may be interchangeably used with an "AF (Auto Focus)".

The term of handshake correction function' used hereinafter may be defined as a function of moving or tilting a lens module to a direction perpendicular to an optical axis in order to offset a vibration (movement) generated by an external force on an image sensor. Meantime, the 'handshake correction' may be interchangeably used with the 'OIS (Optical Image Stabilization)'.

Hereinafter, a configuration of an optical instrument according to an exemplary embodiment of the present invention will be described.

The optical instrument may be any one of a hand phone, a mobile phone, a smart phone, a portable smart device, a digital camera, a notebook computer (laptop computer), a digital broadcasting terminal, a PDA (Personal Digital Assistant), a PMP (Portable Multimedia Player) and a navigation device. However, the present invention is not limited thereto, and any device capable of capturing an image or a photograph may be an optical instrument.

The optical instrument may include a main body (not shown), a dual camera module and a display part (not shown). However, any one or more of the main body, the dual camera module and the display part may be omitted or changed.

The main body may form an external shape of an optical instrument. The main body may include a cubic shape, for example. In another example, the main body may be at least partially rounded. The main body may accommodate a dual camera module. One surface of a main body may be disposed with a display part. One surface of main body may be disposed with a display part and a camera module, and the other surface of the main body (surface opposite to the said one surface) may be additionally disposed with a dual camera module.

The dual camera module may be disposed on the main body. The dual camera module may be disposed on one surface of main body. The dual camera module may be partially accommodated into the main body. The camera module may be formed in a plural number. At least one of the plurality of camera modules may be a single camera module. The plurality of camera modules may be respectively disposed on one surface of main body and the other surface of main body.

The display part may be disposed on the main body. The display part may be disposed on one surface of main body. That is, the display part may be disposed on a same surface as that of the dual camera module. Alternatively, the display part may be disposed at the other surface of main body. The display part may be disposed on a surface disposed at an opposite surface of a surface disposed with the dual camera module. The display part may output an image captured by the dual camera module.

Hereinafter, configuration of a dual camera module according to an exemplary embodiment of the present invention will be described with reference to the accompanying drawings.

Figure 22:
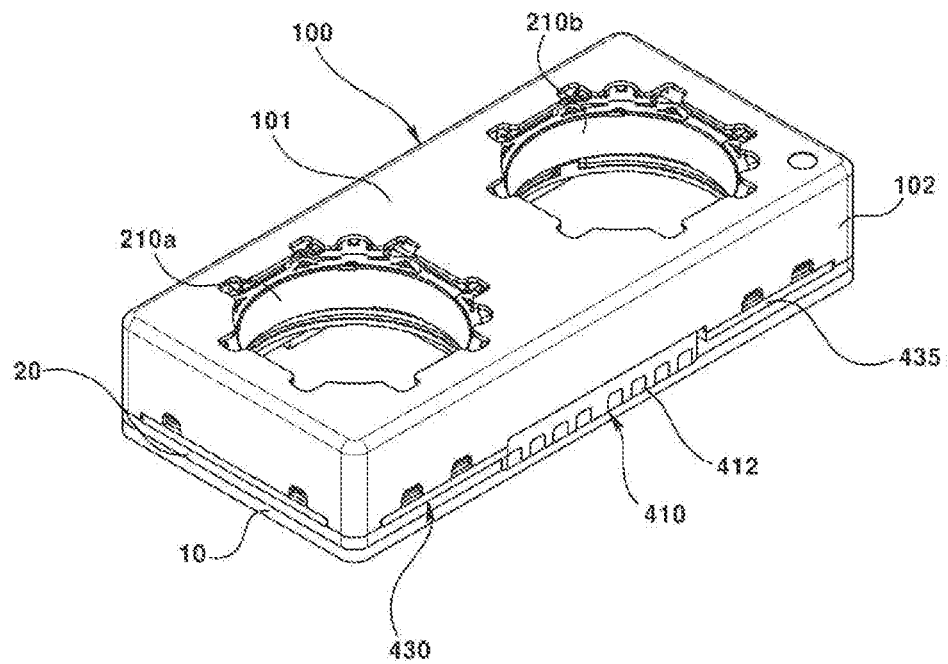
FIG. 22 is a perspective view of a dual camera module according to an exemplary embodiment of the present invention.

FIG. 22 is a perspective view of a dual camera module according to an exemplary embodiment of the present invention.

The dual camera module may comprise a lens module (not shown), an infrared filter (not shown), a PCB (not shown), an image sensor (not shown), a controller (not shown) and a dual lens driving apparatus. However, any one or more of the lens module, the infrared filter, the PCB, the image sensor, the controller and the dual lens driving apparatus may be omitted or changed from the dual camera module.

The lens module may include at least one lens. The lens module may include a lens and a lens barrel. The lens module may include one or more lenses (not shown) and a lens barrel accommodating the lens. However, one element of the lens module is not limited to the lens barrel, and any holder structure capable of supporting one or more lenses may suffice for a lens module. The lens module may include a first lens module and a second lens module. The first lens module may be coupled to a first bobbin (210a). The second lens module may be coupled to a second bobbin (210b). The lens module may integrally move with the bobbin (210a, 210b). The lens module may be coupled to the bobbin (210a, 210b) by way of an adhesive (not shown). For example, the lens module may be screw-connected to the bobbin (210a, 210b). Meantime, a light having passed the lens module may be irradiated on an image sensor.

The infrared filter may shield a light of infrared region from being incident on an image sensor. The infrared filter may be interposed between the lens module and the image sensor. For example, the infrared filter may be disposed on a holder member (20) separately disposed from a base (430). The infrared filter may include a first infrared filter and a second infrared filter. The first infrared filter may be mounted on a first hole (431a) of the base (430). The second infrared filter may be mounted on a second hole (431b) of the base (430). The infrared filter may be formed with a film material or a glass material. The infrared filter may be formed by allowing an infrared cut-off coating material to be coated on a plate-shaped optical filter such as an imaging plane protection cover glass or a cover glass. For example, the infrared filter may be an infrared absorption filter (blue filter) absorbing the infrared. In another example, the infrared filter may be an infrared reflection filter (IR cut-off filter) reflecting the infrared.

A base (430) may be disposed on an upper surface of a PCB (10). The PCB (10) may be disposed at a lower surface of the base (430). However, a separate holder member (20) may be interposed between the PCB (10) and the base (320). The PCB (10) may be disposed with an image sensor. The PCB (10) may be electrically connected to an image sensor. A light having passed the lens module of dual camera module may be irradiated on an image sensor disposed on the PCB (10). The PCB (10) may supply a power (current) to first to third coil (220a, 220b, 220c). Meantime, the PCB (10) may be disposed with a controller for controlling the dual lens driving device.

The image sensor may be disposed on the PCB (10). The image sensor may be electrically connected to the PCB (10). For example, the image sensor may be coupled to the PCB (10) by way of SMT (Surface Mounting Technology) method. In another example, the image sensor may be coupled to the PCB (10) by way of flip chip technology. The image sensor may include a first image sensor and a second image sensor. The first image sensor may be so disposed as to match a first lens module by way of optical axis. The second image sensor may be so disposed as to match a second lens module by way of optical axis. In other words, an optical axis of the image sensor and an optical axis of the lens module may be aligned, through which the image sensor can obtain a light having passed the lens module. The image sensor may convert a light irradiated on an effective image region to an electric signal. The image sensor may be a CCD (Charge Coupled Device), a MOS (Metal Oxide Semi-Conductor), a CPD and a CID. However, the types of image sensor are not limited thereto, and any structure capable of converting an incident light to an electric signal may be included.

The controller may be mounted on the PCB (10). In another example, the controller may be disposed on other configuration than the PCB (10). In another example, the controller may individually control a direction, intensity and an amplitude of a current supplied to the first to third coils (220a, 220b, 220c) to perform any one or more of an AF function and an OIS function of the dual camera module.

That is, the controller may move or tilt the lens module to an optical axis direction or to a direction perpendicular to the optical axis direction. Furthermore the controller may perform any one or more of the feedback control of the AF function and a feedback control of the OIS function. To be more specific, the controller may receive a position of a housing (310) detected by a sensor (800) to perform an OIS feedback control by controlling a current applied to the third coil (422). The said feedback controls by the controller thus mentioned may be generated in real time to allow performing a more accurate AF function and an OIS function.

Hereinafter, configuration of the lens drive device according to an exemplary embodiment of the present invention will be described with reference to the accompanying drawings.

Figure 2:
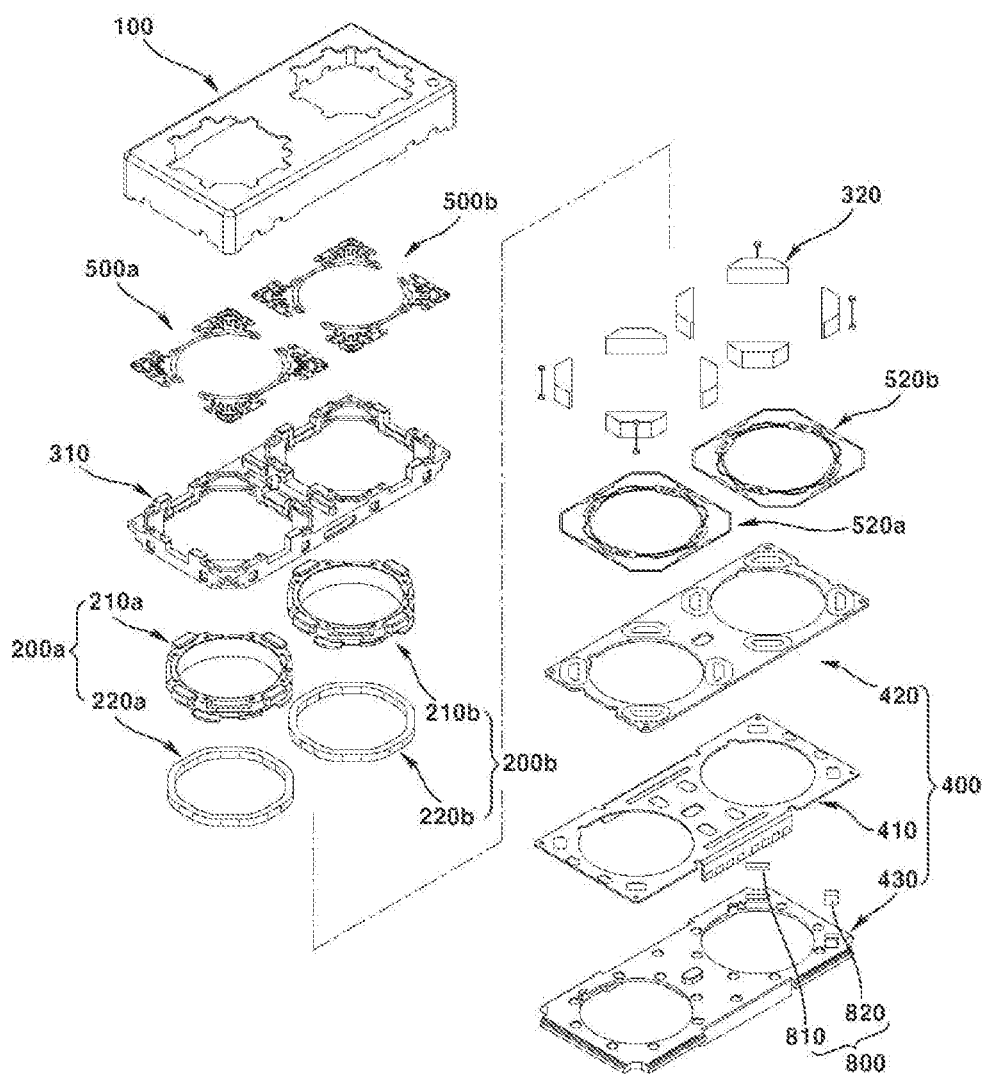
FIG. 2 is an exploded perspective view of a dual lens driving apparatus according to an exemplary embodiment of the present invention.
Figure 3:
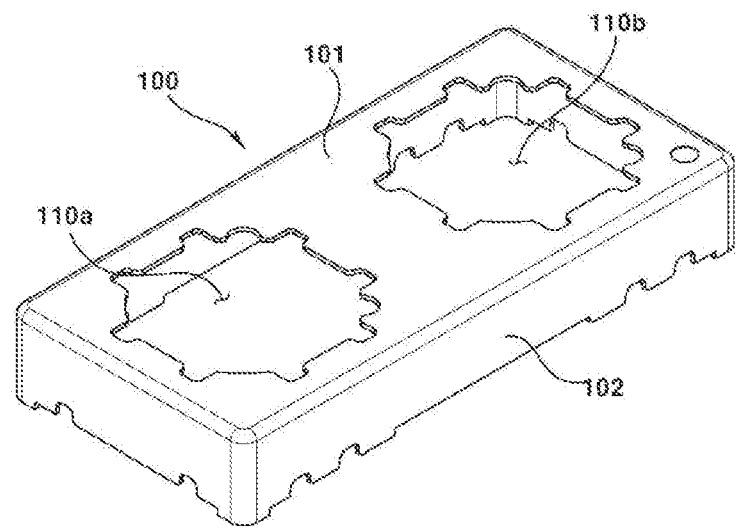
FIG. 3 is a perspective view of a cover member according to an exemplary embodiment of the present invention.
Figure 4:
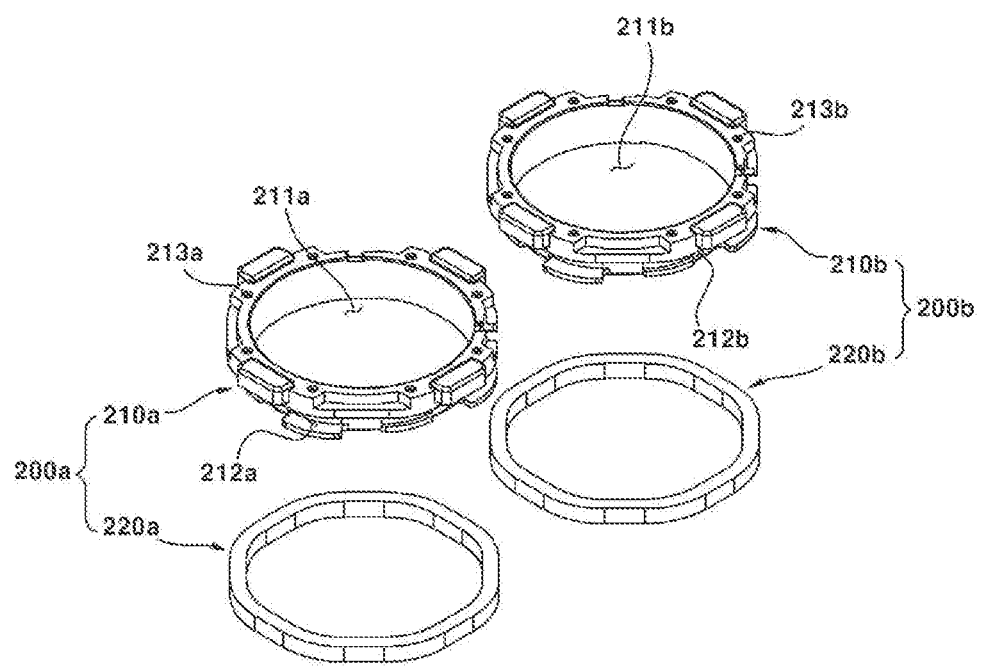
FIG. 4 is an exploded perspective view of a first AF mover and a second AF mover according to an exemplary embodiment of the present invention.
Figure 5:
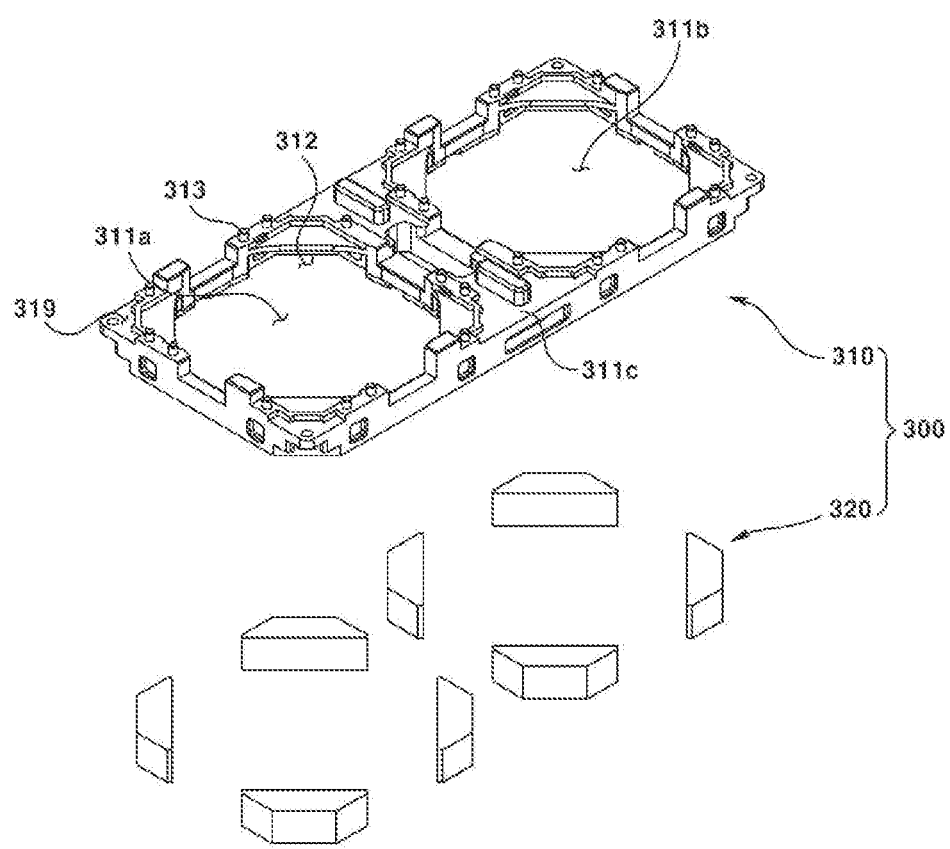
FIG. 5 is an exploded perspective view of an OIS mover according to an exemplary embodiment of the present invention.
Figure 6:
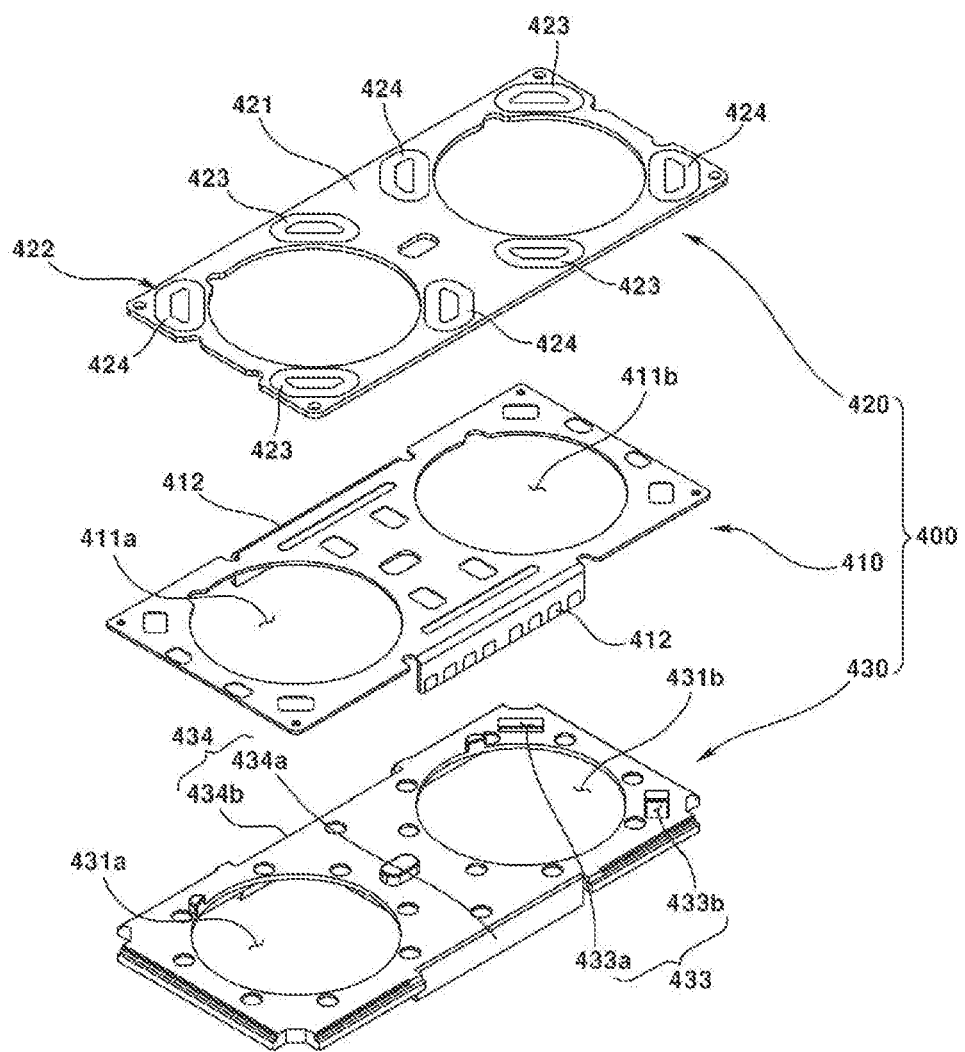
FIG. 6 is an exploded perspective view of a stator according to an exemplary embodiment of the present invention.
Figure 7:
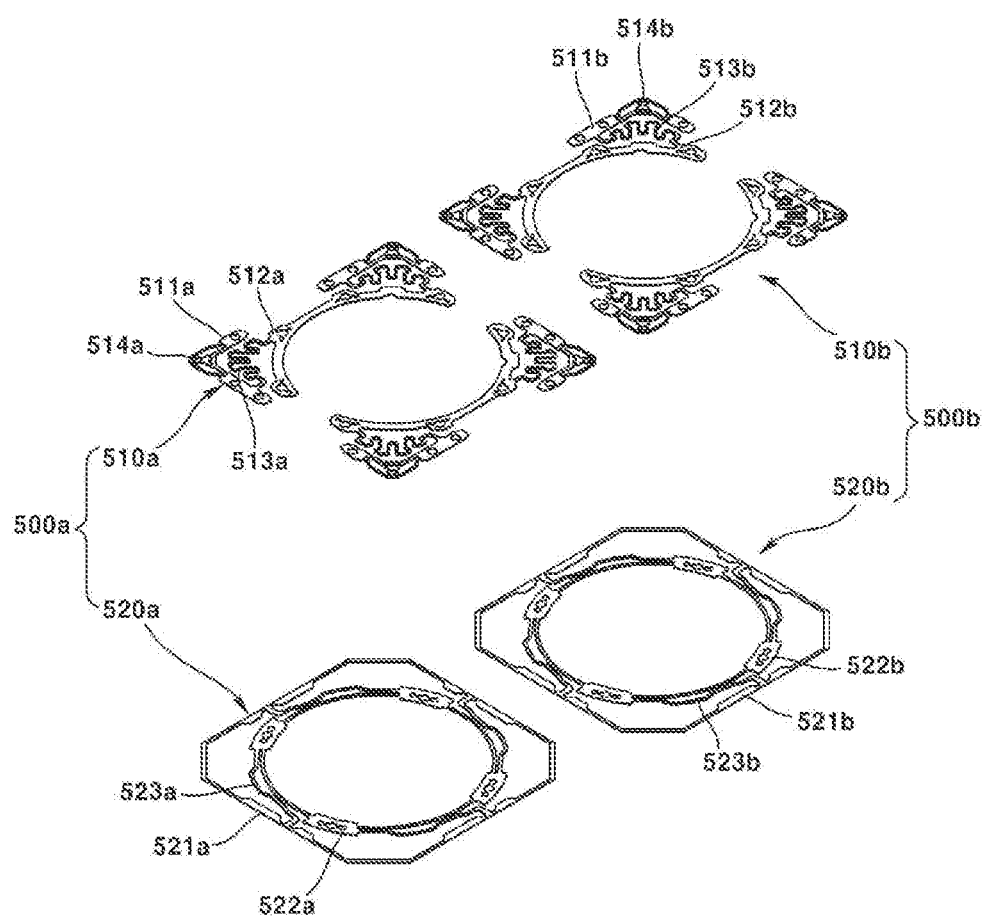
FIG. 7 is an exploded perspective view of a first elastic member and a second elastic member according to an exemplary embodiment of the present invention.
Figure 8:
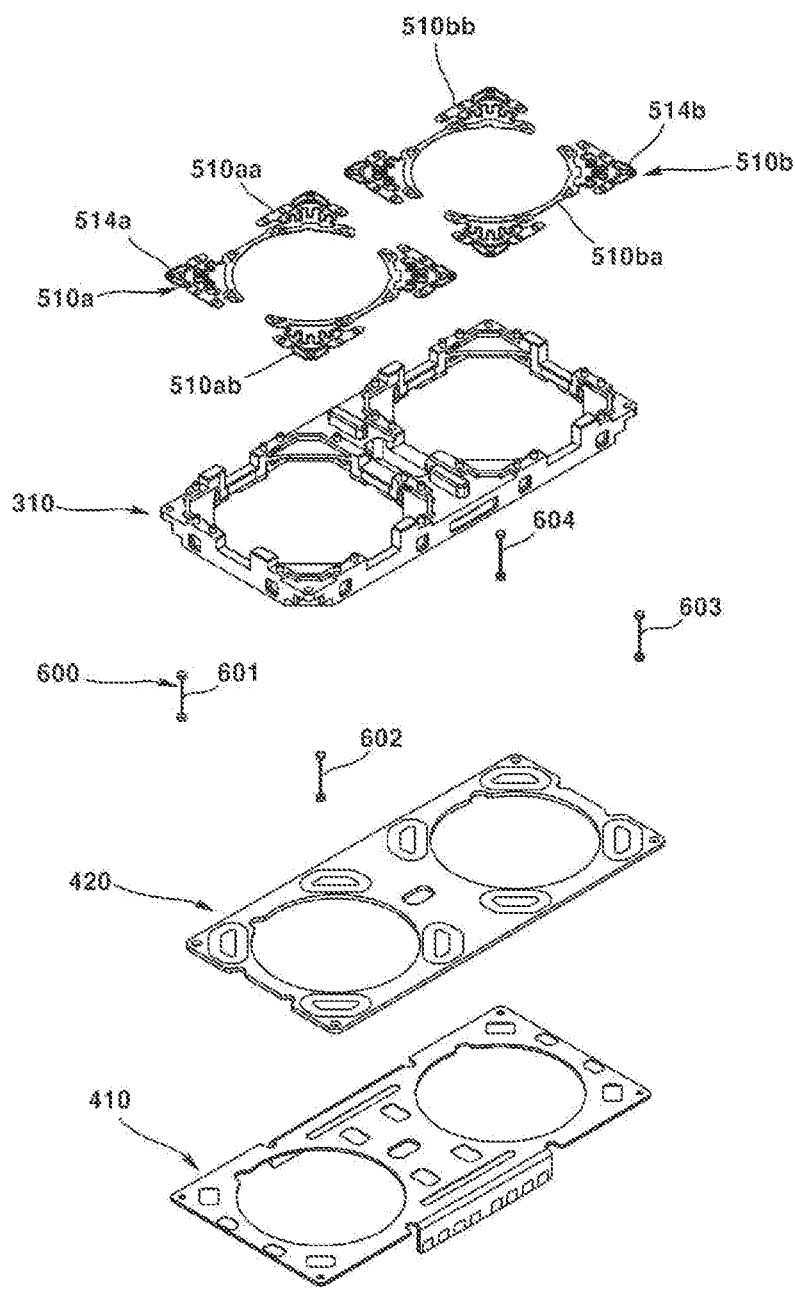
FIG. 8 is an exploded perspective view of a support member and relevant elements according to an exemplary embodiment of the present invention.
Figure 9:
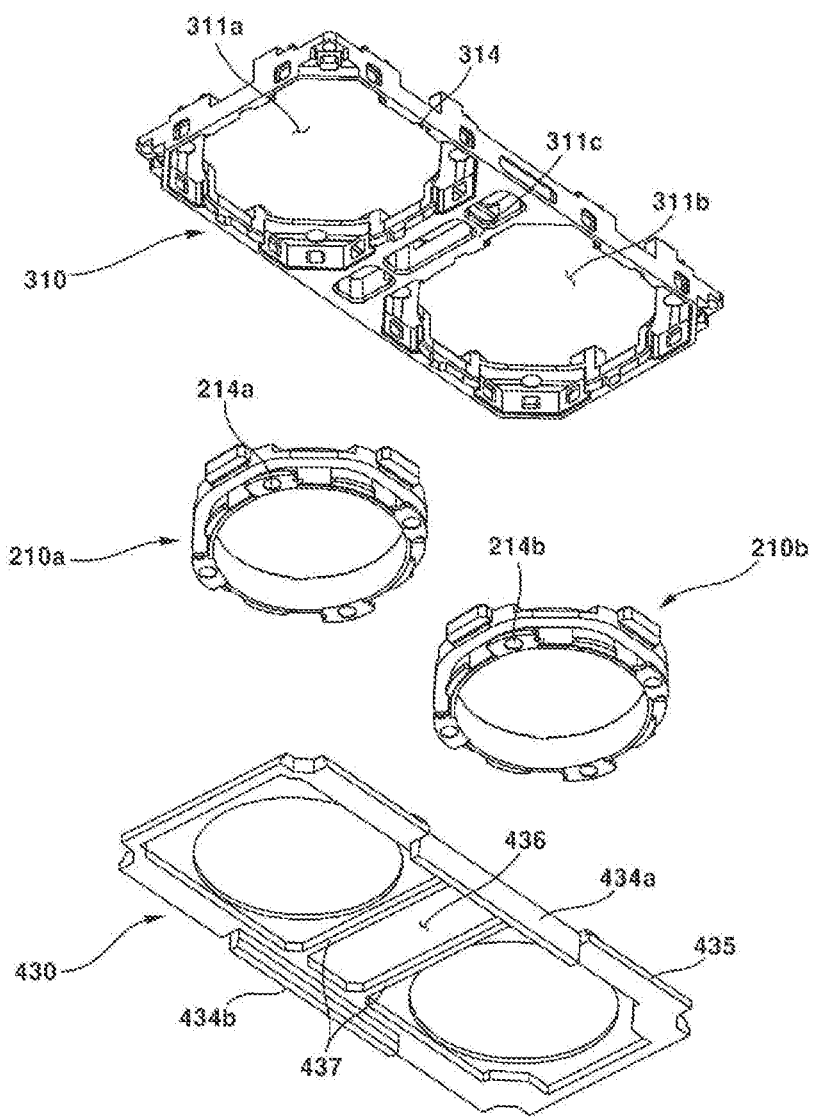
FIG. 9 is a bottom perspective view of a housing, a first bobbin and a base according to an exemplary embodiment of the present invention.
Figure 10:
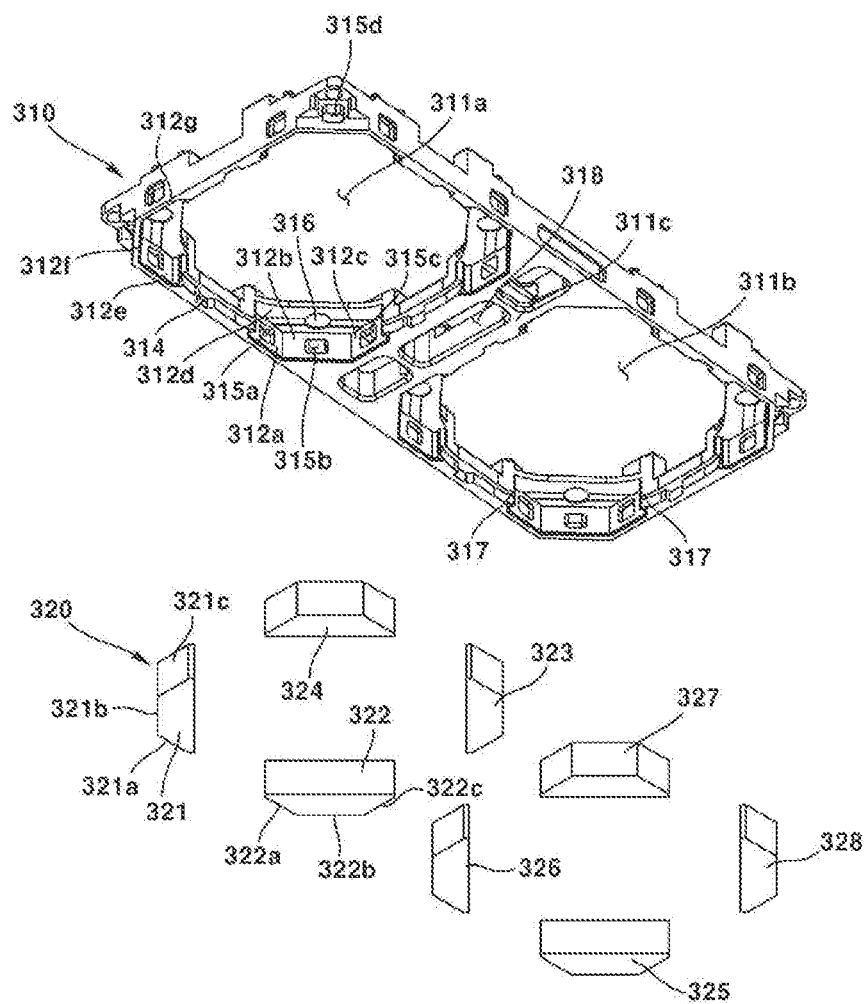
FIG. 10 is a bottom perspective view of a coupled structure between a housing and a magnet according to an exemplary embodiment of the present invention.
Figure 11:
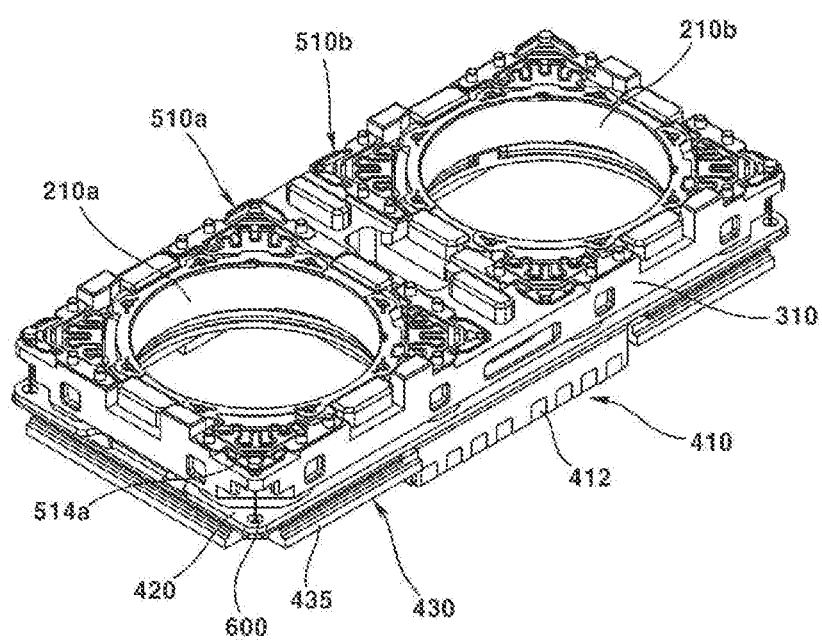
FIG. 11 is a perspective view illustrating a state where a cover member is omitted from FIG. 1.
Figure 12:
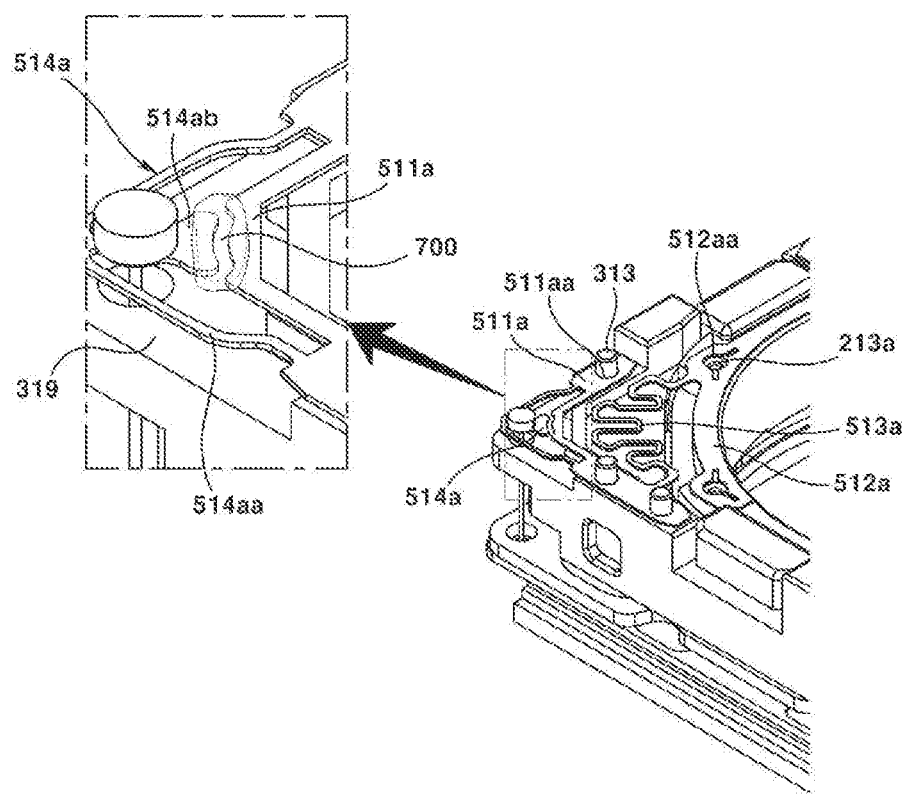
FIG. 12 is a perspective view illustrating a state where some elements of FIG. 11 are enlarged.
Figure 13:
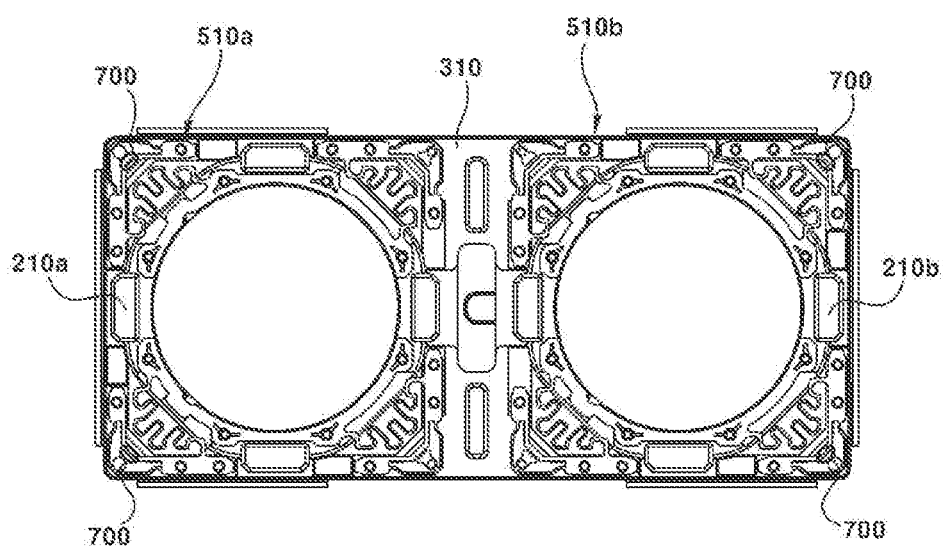
FIG. 13 is a plane view of FIG. 11.
Figure 14:
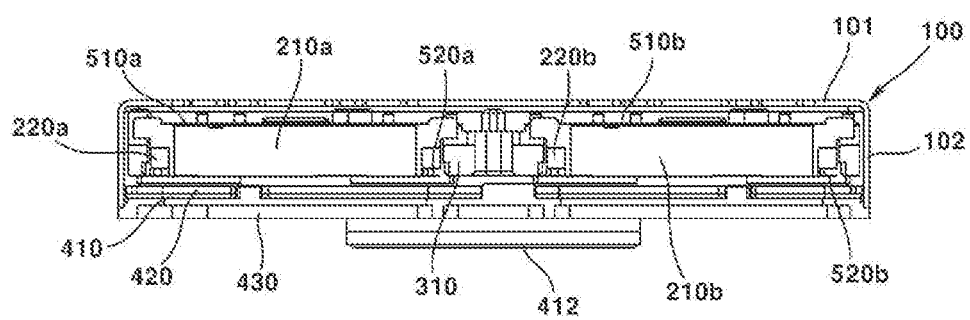
FIG. 14 is a cross-sectional view taken along line X-Y of FIG. 1.
Figure 15:
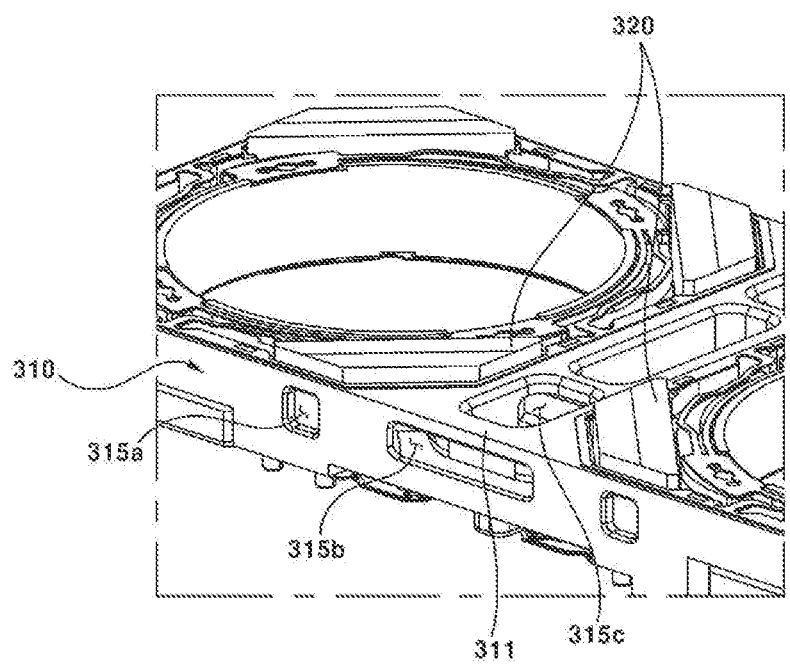
FIG. 15 is a bottom perspective view of some elements of a dual lens driving apparatus according to an exemplary embodiment of the present invention.
Figure 16:
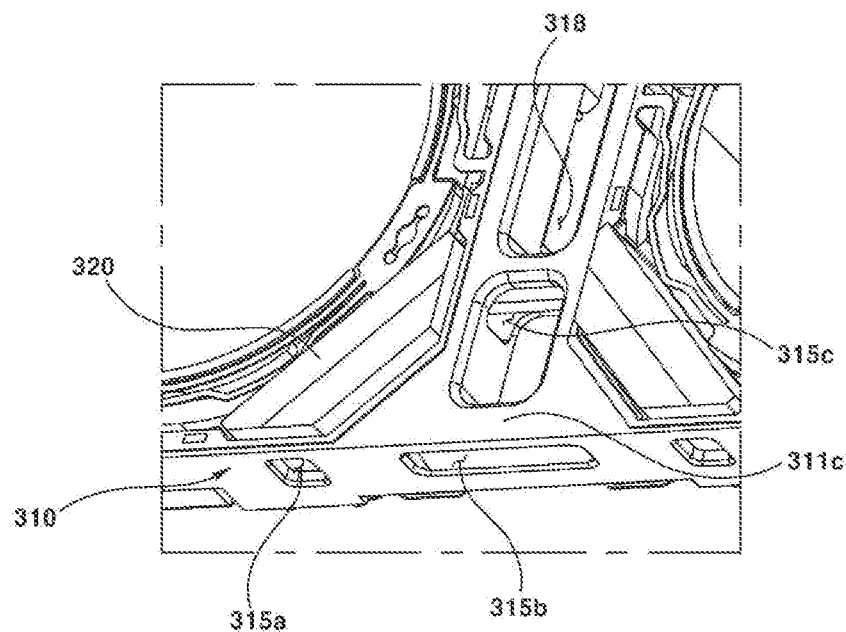
FIG. 16 is a bottom perspective view of some elements of a dual lens driving apparatus according to an exemplary embodiment of the present invention.
Figure 17:
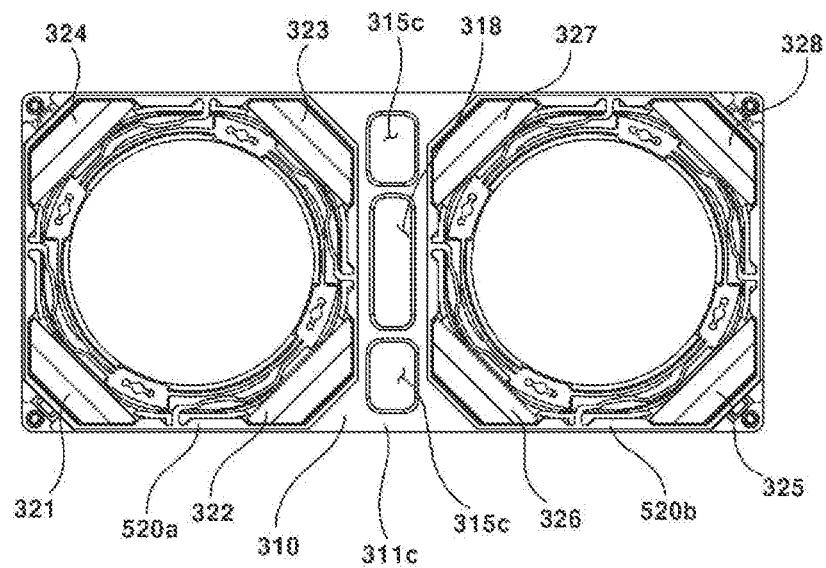
FIG. 17 is a bottom perspective view of some elements of a dual lens driving apparatus according to an exemplary embodiment of the present invention.
Figure 18:
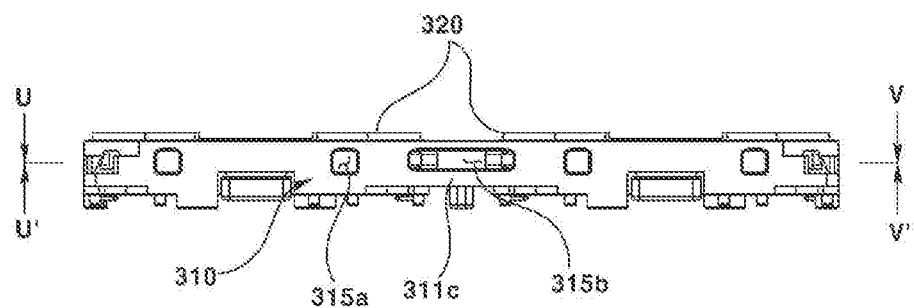
FIG. 18 is a lateral view of FIG. 17.
Figure 19:
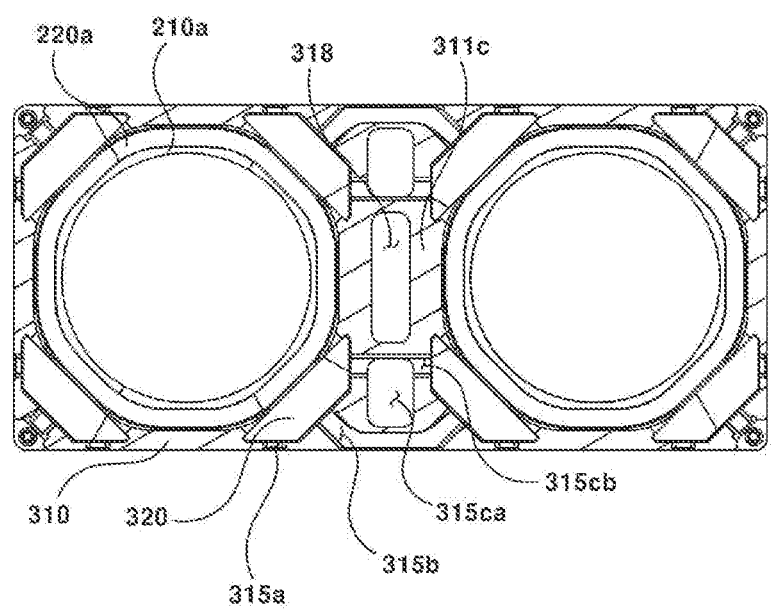
FIG. 19 is a cross-sectional view taken along line U-V of FIG. 18.
Figure 20:
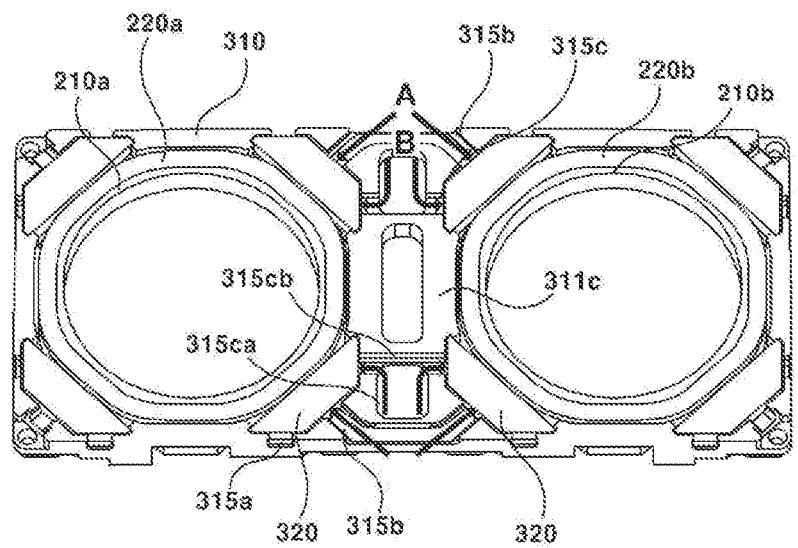
FIG. 20 is a cross-sectional perspective view taken along line U'-V' of FIG. 18.
Figure 21:
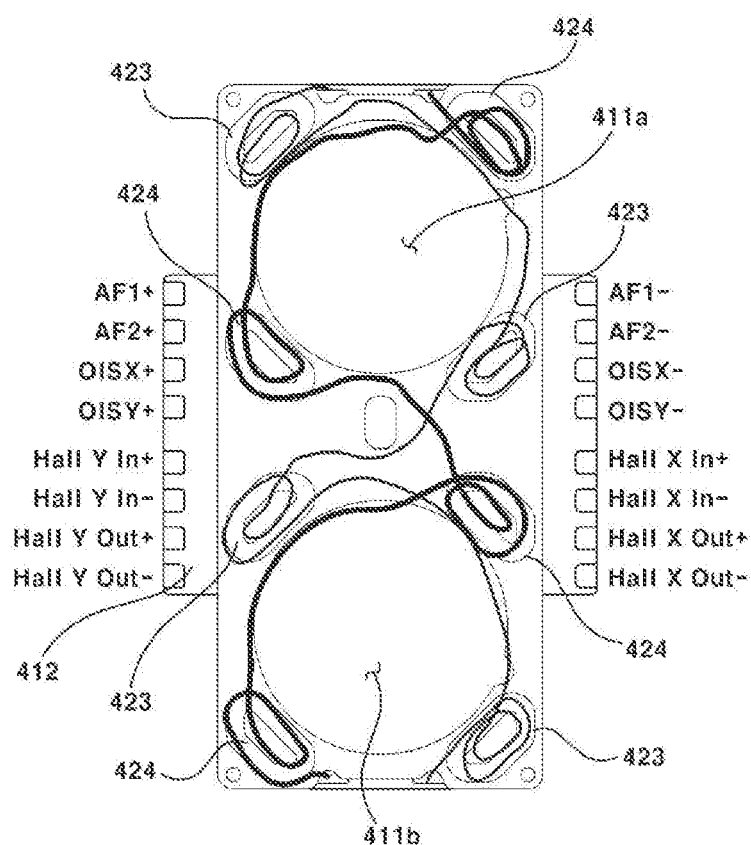
FIG. 21 is a planar view of a board and a circuit member according to an exemplary embodiment of the present invention.
Figure 23:
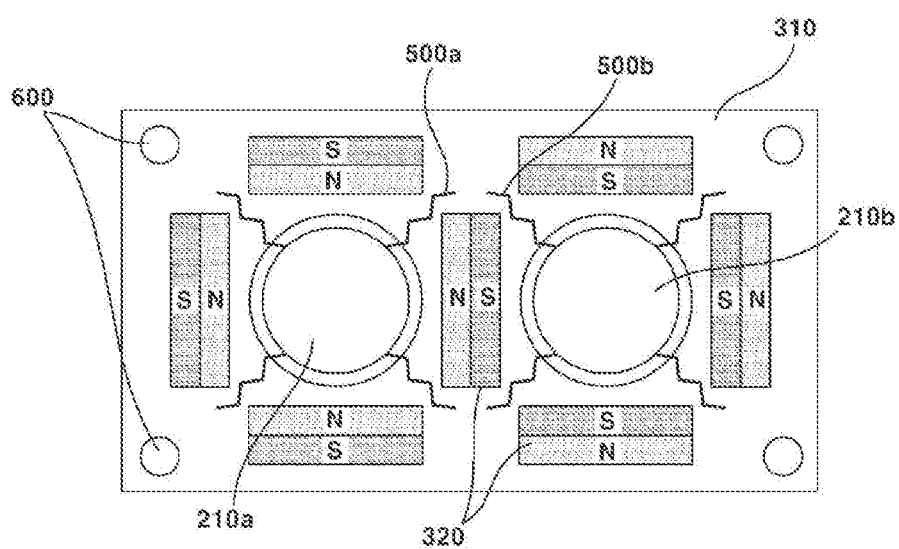
FIG. 23 is a conceptual view illustrating a dual lens driving apparatus according to a modification.

FIG. 1 is a perspective view of a dual lens driving apparatus according to an exemplary embodiment of the present invention, FIG. 2 is an exploded perspective view of a dual lens driving apparatus according to an exemplary embodiment of the present invention, FIG. 3 is a perspective view of a cover member according to an exemplary embodiment of the present invention, FIG. 4 is an exploded perspective view of a first AF mover and a second AF mover according to an exemplary embodiment of the present invention, FIG. 5 is an exploded perspective view of an OIS mover according to an exemplary embodiment of the present invention, FIG. 6 is an exploded perspective view of a stator according to an exemplary embodiment of the present invention, FIG. 7 is an exploded perspective view of a first elastic member and a second elastic member according to an exemplary embodiment of the present invention, FIG. 8 is an exploded perspective view of a support member and relevant elements according to an exemplary embodiment of the present invention, FIG. 9 is a bottom perspective view of a housing, a first bobbin and a base according to an exemplary embodiment of the present invention, FIG. 10 is a bottom perspective view of a coupled structure between a housing and a magnet according to an exemplary embodiment of the present invention, FIG. 11 is a perspective view illustrating a state where a cover member is omitted from FIG. 1, FIG. 12 is a perspective view illustrating a state where some elements of FIG. 11 are enlarged, FIG. 13 is a plane view of FIG. 11, FIG. 14 is a cross-sectional view taken along line X-Y of FIG. 1. FIG. 15 is a bottom perspective view of some elements of a dual lens driving apparatus according to an exemplary embodiment of the present invention, FIG. 16 is a bottom perspective view of some elements of a dual lens driving apparatus according to an exemplary embodiment of the present invention, FIG. 17 is a bottom perspective view of some elements of a dual lens driving apparatus according to an exemplary embodiment of the present invention, FIG. 18 is a lateral view of FIG. 17, FIG. 19 is a cross-sectional view taken along line U V of FIG. 18, FIG. 20 is a cross-sectional perspective view taken along line U'-V' of FIG. 18, FIG. 21 is a planar view of a board and a circuit member according to an exemplary embodiment of the present invention, FIG. 22 is a perspective view of a dual camera module according to an exemplary embodiment of the present invention, and FIG. 23 is a conceptual view illustrating a dual lens driving apparatus according to a modification.

The dual lens driving apparatus may include a cover member (100), a first AF mover (200a), a second AF mover (200b), an OIS mover (300), a stator (400), a first elastic member (500a), a second elastic member (500b), a support member (600), a damper (700) and a sensor (800). However, any one or more of the cover member (100), the first AF mover (200a), the second AF mover (200b), the OIS mover (300), the stator (400), the first elastic member (500a), the second elastic member (500b), the support member (600), the damper (700) and the sensor (800) may be omitted or changed from the dual lens driving apparatus. Particularly, the sensor (800) may be omitted as an element for OIS feedback control.

The cover member (100) may form an external shape of the dual lens drive device. The cover member (100) may take a bottom-opened cubic shape. However, the present invention is not limited thereto. The cover member (100) may be of a non-magnetic substance. If the cover member (100) is formed with a magnetic substance, the magnetic force of the cover member (100) may affect a magnet (320). The cover member (100) may be formed with a metal material. To be more specific, the cover member (100) may be formed with a metal plate. In this case, the cover member (100) may shield an EMI (Electro Magnetic Interference). Because of the said characteristic of the cover member (100), the cover member (100) may be called an "EMI shield can". The cover member (100) can shield radio waves generated from outside of the lens drive device from being introduced into the cover member (100). Furthermore, the cover member (100) may shield radio waves generated from inside of the cover member (100) from being discharged to outside of the cover member (100).

The cover member (100) may include an upper plate (101) and a side plate (102). The cover member (100) may include an upper plate (101) and a side plate (102) extended by being bent from the upper plate (101). The cover member (100) may include an upper plate (101) and a side plate (102) extended downwardly from an outer periphery of the upper plate (101). For example, the cover member (100) may be coupled to the base (430). A portion of the side plate (102) at the cover member (100) may be coupled to the base (430). A lower end of the side plate (102) of the cover member (100) may be coupled to a step (staircase, 435) of the base (430). The lower end of the side plate (102) may be coupled to the base (430). An inner lateral surface of the side plate (102) of the cover member (100) may be directly contacted to an outside lateral surface of the base (430). An inner lateral surface of the side plate (102) at the cover member (100) may be coupled to the base (430) by an adhesive (not shown). In another example, the cover member (100) may be directly coupled to an upper surface of the PCB (10). An inner space formed by the cover member (100) and the base (430) may be disposed with any one or more of a first AF mover (200a), a second AF mover (200b), an OIS mover (300), a stator (400), a first elastic member (500a), a second elastic member (500b) and a support member (600). Through this structure, the cover member (100) can protect inner elements from an outside shock and simultaneously prevent an outside foreign object from being inwardly introduced. The cover member (100) may be integrally formed.

The cover member (100) may include a first opening (110a) and a second opening (110b). The cover member (100) may include a first opening (110a) on the upper plate (101) formed at a position corresponding to that of the first bobbin (210a). The cover member (100) may include a second opening (110b) on the upper plate (101) formed at a position corresponding to that of the second bobbin (210b).

The openings (110a, 110b) may be formed on the upper plate (101) of cover member (100). The openings (110a, 110b) may upwardly expose a lens module. The openings (110a, 110b) may take a shape corresponding to that of the lens module. Each of the openings (110a, 110b) may be greater in size than a diameter of lens module to allow the lens module to be assembled through the openings (110a, 110b). A light having been introduced into and through the openings (110a, 110b) may pass through the lens module. At this time, the light having passed the lens module may be converted to an electric signal by an image sensor and may be obtained as an image.

The first AF mover (200a) may be coupled with the first lens module. The first AF mover (200a) may be accommodated into an inside of the first lens module. An inner periphery surface of first AF mover (200a) may be coupled to an outer periphery surface of the first lens module. The first AF mover (200a) may be moved through interaction with the OIS mover (300) and/or the mover (400). At this time, the first AF mover (200a) may move integrally with the first lens module. The first AF mover (200a) may move for AF focus function.

The first AF mover (200a) may include a first bobbin (210a) and a first coil (220a). However, any one or more of the first bobbin (210a) and the first coil (220a) may be omitted or changed from the first AF mover (200a).

The first bobbin (210a) may be disposed at an inside of the housing (310). The first bobbin (210a) may be so disposed at an inside of the housing (310) as to move to a first direction. The first bobbin (210a) may be disposed at a first bobbin reception part (311a) of the housing (310). The first bobbin (210a) may move to an optical axis direction about the housing (310). The first bobbin (210a) may be so disposed at the first bobbin reception part (311a) of housing (310) as to move along an optical axis. The first bobbin (210a) may be coupled with the first lens module. An inner periphery surface of first bobbin (210a) may be coupled to an outer periphery surface of the first lens module. The first bobbin (210a) may be coupled with the first coil (220a). An outer periphery surface of first bobbin (210a) may be coupled by the first coil (220a). An upper surface of first bobbin (210a) may be coupled with a first upper elastic member (510a). A lower surface of first bobbin (210a) may be coupled with a first lower elastic member (520a).

The first bobbin (210a) may include a first hole (211a), a first driving part coupling part (212a), a first groove (213a) and a second groove (214a). However, any one or more of the first hole (211a), the first driving part coupling part (212a), the first groove (213a) and the second groove (214a) may be omitted from the first bobbin (210a).

The first hole (211a) may be disposed at an inside of the first bobbin (210a). The first hole (211a) may be so formed as to be opened at an upper side and a bottom side. The first hole (211a) may be coupled by the first lens module. An inner periphery surface of the first hole (211a) may be formed with a screw thread corresponding to that formed on an outer periphery surface of the first lens module. That is, the first hole (211a) may be screw-connected with the first lens module. An adhesive may be interposed between the first lens module and the first bobbin (210a). At this time, the adhesive may be an epoxy hardened by any one or more of UV, heat and laser.

The first driving part coupling part (212a) may be coupled by a first coil (220a). The first driving part coupling part (212a) may be formed on an outer periphery surface of first bobbin (210a). The first driving part coupling part (212a) may be formed by a groove formed by allowing a portion of the outer periphery surface of first bobbin (210a) to be inwardly recessed. At this time, the first driving part coupling part (212a) may be accommodated by at least a portion of the first coil (220*a*). The first driving part coupling part (212*a*) may be integrally formed with the outer periphery surface of first bobbin (210*a*). For example, the first driving part coupling part (212*a*) may be continuously formed along the outer periphery surface of first bobbin (210*a*). At this time, the first driving part coupling part (212*a*) may be wound with the first coil (220*a*). In another example, the first driving part coupling part (212*a*) may be formed in a plural number, each being mutually spaced apart. At this time the first coil (220*a*) may be also formed in a plural number to be respectively coupled to the first driving part coupling part (212*a*). In still another example, the first driving part coupling part (212*a*) may be formed with an upper side opened or a bottom side opened. At this time, the first coil (220*a*) may be inserted into and coupled with the first driving part coupling part (212*a*) through the opening in a pre-wound state.

An upper surface of first bobbin (210*a*) may be formed with a first groove (213*a*) corresponding to a second coupling hole (512*aa*) of an internal part (512*a*) of the first upper elastic member (510*a*) and accommodating an adhesive. The first groove (213*a*) may be formed by allowing a portion of the upper surface of the first bobbin (213*a*) to be recessed. The first groove (213*a*) can accommodate an adhesive. The first groove (213*a*) may be formed to correspond to a second hole (512*aa*) of the internal part (512*a*) of the first upper elastic member (510*a*). The first groove (213*a*) may be formed at a position corresponding to that of the second coupling hole (512*aa*) of the internal part (512*a*). The first groove (213*a*) may be formed with a shape corresponding to that of the second coupling hole (512*aa*) of the internal part (512*a*). The first groove (213*a*) may be coupled to the first upper elastic member (510*a*). The first reception groove (213*a*) may be coupled with the internal part (512*a*) of the first upper elastic member (510*a*).

The first coil (220*a*) may be disposed on the first bobbin (210*a*). The first coil (220*a*) may be disposed at an outer periphery surface of first bobbin (210*a*). The first coil (220*a*) may be directly wound on the first bobbin (210*a*). The first coil (220*a*) may face a magnet (320). In this case, when a current is supplied to the first coil (220*a*) to form a magnet field about the first coil (220*a*), the first coil (220*a*) may move relative to the magnet (320) in response to an electromagnetic interaction between the first coil (220*a*) and the magnet (320). The first coil (220*a*) may electromagnetically interact with the magnet (320). The first coil (220*a*) may move the first bobbin (210*a*) relative to the housing (310) to an optical axis through the electromagnetic interaction with the magnet (320). For example, the first coil (220*a*) may be an integrally formed coil. In another example, the first coil (220*a*) may include a plurality of coils each spaced apart from the other. The first coil (220*a*) may include four (4) coils each spaced apart. At this time, the said four coils may be disposed at an outer periphery surface of the first bobbin (210*a*) in order to allow two adjacent coils to mutually form a 90°.

The first coil (220*a*) may include a pair of lead cables for power supply. At this time, the pair of lead cables of the first coil (220*a*) may be electrically connected to a first upper elastic unit (510*aa*) and a second upper elastic unit (510*ab*) of the first upper elastic member (510*a*). That is, the first coil (220*a*) may receive a power through the first upper elastic member (510*a*). To be more specific, the first coil (220*a*) may receive a power sequentially through the PCB (10), the board (410), the support member (600) and the first upper elastic member (510*a*).

The second AF mover (200*b*) may be coupled with the second lens module. The second AF mover (200*b*) may be accommodated into an inside of the second lens module. An inner periphery of the second AF mover (200*b*) may be coupled to an outer periphery surface of the second lens module. The second AF mover (200*b*) may be moved through the interaction with the OIS mover (300) and/or the stator (400). At this time, the second AF mover (200*b*) may integrally move with the second lens module. The second AF mover (200*b*) may be moved for autofocus function. The second AF mover (200*b*) may move independently from the first AF mover (200*a*). A moving direction of the second AF mover (200*b*) and a moving direction of the first AF mover (200*a*) may be parallel.

The second AF mover (200*b*) may include a second bobbin (210*b*) and a second coil (220*b*). However, any one or more of the second bobbin (210*b*) and the second coil (220*b*) may be omitted or changed from the second AF mover (200*b*).

The second bobbin (210*b*) may be disposed at an inside of the housing (310). The second bobbin (210*b*) may be so disposed at an inside of the housing (310) as to move to a first direction. The second bobbin (210*b*) may be spaced apart from the first bobbin (210*a*). The second bobbin (210*b*) may be so disposed at an inside of the housing (310) as to move to the first direction. The second bobbin (210*b*) may be disposed on a second bobbin reception part (311*b*) of the housing (310). The second bobbin (210*b*) may be moved to an optical axis direction about the housing (310). The second bobbin (210*b*) may be disposed at the second bobbin reception part (311*b*) of the housing (310) as to be moved to an optical axis. The second bobbin (210*b*) may be coupled with the second lens module. An inner periphery surface of the second bobbin (210*b*) may be coupled by an outer periphery surface of the second lens module. The second bobbin (210*b*) maybe coupled by the second coil (220*b*). An outer periphery surface of second bobbin (210*b*) may be coupled by the second coil (220*b*). An upper surface of second bobbin (210*b*) may be coupled by the second upper elastic member (510*b*). A lower surface of second bobbin (210*b*) may be coupled with the second lower elastic member (520*b*).

The second bobbin (210*b*) may include a second hole (211*b*), a second driving part coupling part (212*b*), an upper groove (214*b*) and a lower groove (214*b*). However, any one or more of the second hole (211*b*), the second driving part coupling part (212*b*), the upper groove (214*b*) and the lower groove (214*b*) may be omitted or changed from the second bobbin (210*b*).

The second hole (211*b*) may be formed at an inside of the second bobbin (210*b*). The second hole (211*b*) may be so formed as to be opened at an upper side and a bottom side. The second hole (211*b*) may be coupled by the second lens module. An inner periphery surface of the second hole (211*b*) may be formed with a screw thread corresponding to that formed on an outer periphery surface of the second lens module. That is, the second hole (211*b*) may be screw-connected with the second lens module. An adhesive may be interposed between the second lens module and the second bobbin (210*b*). At this time, the adhesive may be an epoxy hardened by any one or more of UV, heat and laser.

The second driving part coupling part (212*b*) may be coupled by a second coil (220*b*). The second driving part coupling part (212*b*) may be formed on an outer periphery surface of second bobbin (210*b*). The second driving part coupling part (212*b*) may be formed by a groove formed by allowing a portion of the outer periphery surface of second bobbin (210b) to be inwardly recessed. At this time, the second driving part coupling part (212b) may be accommodated by at least a portion of the second coil (220b). The second driving part coupling part (212b) may be integrally formed with the outer periphery surface of second bobbin (210b). For example, the second driving part coupling part (212b may be continuously formed along the outer periphery surface of second bobbin (210b). At this time, the second driving part coupling part (212b) may be wound with the second coil (220b). In another example, the second driving part coupling part (212b) may be formed in a plural number, each being mutually spaced apart. At this time, the second coil (220b) may be also formed in a plural number to be respectively coupled to the second driving part coupling part (212b). In still another example, the second driving part coupling part (212b) may be formed with an upper side opened or a bottom side opened. At this time, the second coil (220b) may be inserted into and coupled with the second driving part coupling part (212b) through the opening in a pre-wound state.

A lower surface of second bobbin (210b) may be disposed with a lower groove (214b) corresponding to a third coupling hole of an internal part (522b) of a second lower elastic member (520b) and accommodating an adhesive. The lower groove (214b) may be formed by allowing a portion of a lower surface of the second bobbin (210b) to be recessed. The lower groove (214b) can accommodate an adhesive. The lower groove (214b) may correspond to a third coupling hole of the internal part (522b). The lower groove (214b) may be formed at a position corresponding to that of the third coupling hole of the internal part (522b). The lower groove (214b) may be formed with a shape corresponding to that of the third coupling hole of the internal part (522b). The lower groove (214b) may be coupled with the second lower elastic member (520b). The lower groove (214b) may be coupled to the internal part (522b) of the second lower elastic member (520b).

The second coil (220b) may be disposed on the second bobbin (210b). The second coil (220b) may be disposed at an outer periphery surface of second bobbin (210b). The second coil (220b) may be directly wound on the second bobbin (210b). The second coil (220b) may face a magnet (320). In this case, when a current is supplied to the second coil (220b ) to form a magnet field about the second coil (220b), the second coil (220b) may move relative to the magnet (320) in response to an electromagnetic interaction between the second coil (220b) and the magnet (320). The second coil (220b) may electromagnetically interact with the magnet (320). The second coil (220b) may move the second bobbin (210b) relative to the housing (310) to an optical axis through the electromagnetic interaction with the magnet (320). For example, the second coil (220b) may be an integrally formed coil. In another example, the second coil (220b) may include a plurality of coils each spaced apart from the other. The second coil (220b) may include four (4) coils each spaced apart. At this time, the said four coils may be disposed at an outer periphery surface of the second bobbin (210b) in order to allow two adjacent coils to mutually form a 90°.

The second coil (220b) may include a pair of lead cables for power supply. At this time, the pair of lead cables of the second coil (220b) may be electrically connected to a third upper elastic unit (510ba) and a fourth upper elastic unit (510bb) of the second upper elastic member (510b). That is, the second coil (220b) may receive a power through the second upper elastic member (510b). To be more specific, the second coil (220b) may receive a power sequentially through the PCB (10), the board (410), the support member (600) and the second upper elastic member (510b).

The OIS mover (300) may accommodate, at an inside, at least a portion of a first AF mover (200a) and a second AF mover (200b). The OIS mover (300) may move the first AF mover (200a) and the second AF mover (200b) or may move along with the first AF mover (200a) and the second AF mover (200b). The OIS mover (300) may be moved through the interaction with the stator (400). The OIS mover (300) may be moved for OIS function. The OIS mover (300) may be integrally moved with the AF movers (200a, 200b) for the OIS function.

The OIS mover (300) may include a housing (310) and a magnet (320). However, any one or more of the housing (310) and the magnet (320) may be omitted or changed from the OIS mover (300).

The housing (310) may be disposed at an outside of the bobbin (210a, 210b). The housing (310) may accommodate, at an inside thereof, at least a portion of the bobbin (210a, 210b). For example, the housing (310) may take a cubic shape. The housing (310) may include four side surfaces, and four corner portions disposed among the four side surfaces. The housing (310) may be disposed with a magnet (320). Each of the four corner portions of housing (310) may be disposed with the magnet (320). In a modification, each of the four side surfaces of the housing (310) may be disposed with the magnet (320). At least a portion of an outer periphery surface of housing (310) may take a shape corresponding to that of an inner periphery surface of cover member (100). Particularly, the outer periphery surface of housing (310) may take shape corresponding to that of an inner periphery surface of side (lateral) plate (102) of cover member (100). The housing (310) may be formed with an insulation material. The housing (310) may be formed with a material different from that of the cover member (100). The housing (310) may be formed with an injection object in consideration of productivity. An outer lateral surface of housing (310) may be spaced apart from an inner lateral surface of side (lateral) plate (102) at the cover member (100). The housing (310) may move for OIS driving in a discrete space between the housing (310) and the cover member (100). An upper surface of housing (310) may be coupled by the upper elastic member (510a, 510b). A lower surface of housing (310) may be coupled by the lower elastic member (520a, 520b).

The housing (310) in the exemplary embodiment of the present invention may be integrally formed. That is, in the exemplary embodiment of the present invention, two driving parts for AF driving are separately controlled while a driving part for OIS driving is singly controlled. In other words, in the exemplary embodiment of the present invention, although the first lens module and the second lens module are separately moved during AF driving, the first lens module and the second lens module are integrally moved during OIS driving. The mutual interference among magnets can be ruled out in the dual OIS VCM structure through the exemplary embodiment of the present invention. In the present exemplary embodiment, each of the housing (310), the base (430) and the board (410) may be integrally formed.

The housing (310) may include a bobbin reception part (311a, 311b), a connection part (311c), a driving part coupling part (312) and a lug (313). The housing (310) may further include a third groove (314), holes (315a, 315b, 315c, 315d), a groove (316), a support part (317), a fifth hole (318) and a recessed part (319). However, any one or more of the bobbin reception part (311a, 311b), the connection part (311c), the driving part coupling part (312), the lug (313), the third reception groove (314), the holes (315a, 315b, 315c, 315d), the groove (316), the support part (317), the fifth hole (318) and the recessed part (319) may be omitted or changed from the housing (310).

The housing (310) may include a first bobbin reception part (311a) disposed with a first bobbin (210a), a second bobbin reception part (311b) disposed with a second bobbin (210b), and a connection part (311c) connecting the first bobbin (210a) reception part and the second bobbin (210b) reception part. The connection part (311c) may be interposed between an inner periphery surface forming a first hole disposed with the first bobbin (210a) and an inner periphery surface forming a second hole disposed with the second bobbin (210b). The connection part (311c) may be extended from a lateral surface of one side of housing (310) to a lateral surface of the other surface of housing (310).

The bobbin reception part (311a, 311b) may be formed on the housing (310). The bobbin reception part (311a, 311b) may be formed at an inside of the housing (310). The bobbin reception part (311a, 311b) may include a hole so formed as to vertically pass through the housing (310). The bobbin reception part (311a, 311b) may include a first bobbin reception part (311a) and a second bobbin reception part (311b). The first bobbin reception part (311a) may be disposed with a first bobbin (210a). The second bobbin reception part (311b) may be disposed with a second bobbin (210b). The bobbin reception part (311a, 311b) may be movably disposed with the bobbin (210a, 210b). At least a portion of the bobbin reception part (311a, 311b) may take a shape corresponding to that of the bobbin (210a, 210b). An inner periphery surface of the housing (310) forming a hole of the bobbin reception part (311a, 311b) may be spaced apart from an outer periphery surface of the bobbin (210a, 210b). However, a portion of the bobbin (210a, 210b) may be formed with a stopper protruding to an outside to contact an upper surface of the housing (310) and to mechanically restrict an optical axis direction movement of the bobbin (210a, 210b). The connection part (311c) may connect the first bobbin reception part (311a) and the second bobbin reception part (311b). The connection part (311c) may be interposed between the first bobbin (210a) and the second bobbin (210b).

The driving part coupling part (312) may be coupled by a magnet (320). The driving part coupling part (312) may be formed on the housing (310). The driving part coupling part (312) may be formed on an inner periphery surface of the housing (310). In this case, it is advantageous for the magnet (320) disposed on the driving part coupling part (312) to electromagnetically interact with the first and second coils (220a, 220b) disposed on an inside of the magnet (320). The driving part coupling part (312) may take a bottom-opened shape. In this case, the magnet (320) disposed on the driving part coupling part (312) may have an advantageous electromagnetic interaction with the third coil (422) disposed at a lower side of the magnet (320). The driving part coupling part (312) may be formed as a groove formed by allowing an inner periphery surface of housing (310) to be outwardly recessed. At this time, the driving part coupling part (312) may be formed in a plural number. Meantime, each of the driving part coupling part (312) may be accommodated by a magnet (320). For example, the driving part coupling part (312) may be divided to eight (8) pieces. Each of the eight driving part coupling parts (312) may be disposed with the magnet (320). The driving part coupling part (312) may be formed on a corner portion of the housing (310). In a modification, the driving part coupling part (312) may be formed on a lateral surface of housing (310).

The housing (310) may include a first coupling surface (312a) coupled with a first lateral surface (322a) of second corner magnet (322), a second coupling surface (312b) coupled with a second lateral surface (322b) of second corner magnet (322) and a third coupling surface (312c) coupled with a third lateral surface (322c) of second corner magnet (322). The second coupling surface (312b) may be formed between the first coupling surface (312a) and the third coupling surface (312c). The housing (310) may include a fourth coupling surface (312d) coupled with an upper surface of second corner magnet (322). That is, the housing (310) may be coupled with at least four (4) surfaces of the second corner magnet (322). The housing (310) may be coupled with at least four surfaces of second corner magnet (322) using an adhesive.

The housing (310) may include a fifth coupling surface (312e) coupled with a first lateral surface (321a) of first corner magnet (321), a sixth coupling surface (312f) coupled with a second lateral surface (312b) of first corner magnet (321), and a seventh coupling surface (312g) coupled with a third lateral surface (321c) of first corner magnet (312). The sixth coupling surface (312f) may be formed between the fifth coupling surface (312e) and the seventh coupling surface (312g). The housing (310) may be coupled with at least four (4) surfaces of the first corner magnet (321). The housing (310) may be coupled with at least four surfaces of first corner magnet (321) using an adhesive.

The housing (310) may be formed with a first hole (315a) passing through a portion of a lateral surface of housing (310) and through a portion of the first coupling surface (312a). The housing (310) may be formed with a second through hole (315b) passing through a portion of a lateral surface of housing (310) and through a portion of a second coupling surface (312b). The housing (310) may be formed with a third hole (315c) passing through a portion of a lateral surface of housing (310) and through a portion of a third coupling surface (312c). The first hole (315a), the second hole (315b) and the third hole (315c) may be used to infuse an adhesive between the housing (310) and the second corner magnet (322). Thus, the first hole (315a), the second hole (315b) and the third hole (315c) may be respectively called an "adhesive infuse hole". The second hole (315b) may pass through a portion of a lateral surface of connection part (311c) and through a portion of the second coupling surface (312b). The third hole (315c) may pass through a portion of a lower surface of connection part (311c) and through a portion of the third coupling surface (312c).

The housing (310) may be formed with a hole disposed on the connection part (311c) to allow exposing at least a portion of one surface of the magnet (320). The hole may include a second hole (315b) extended from a lateral surface of the connection part (311c) to allow exposing a portion of the second side surface (322b) of the magnet (320). The hole may include a third hole (315c) extended from a lower surface of the connection part (311c) to allow exposing a portion of the third side surface (322c). The third hole (315c) may include a first passage (315ca) extended with a predetermined shape from a lower surface to an upper side, and a second passage (315cb) that is connected to the first passage (315ca) and horizontally extended. The second hole (315b) and the third hole (315c) may be mutually spaced apart from the other. The second hole (315b) and the third hole (315c) may not be connected. The third hole (315c) may be downwardly opened but may not be opened upwardly. For convenience of explanation, although the first hole (315a), the second hole (315b) and the third hole (315c) are distinguished as a first hole, a second hole and a third hole, the first hole (315a), the second hole (315b) and the third hole (315c) all may be called a 'hole', and the order of the holes may be changed and the holes may be interchangeably called. In the present exemplary embodiment, at least one surface of the magnet (320) may be seen from outside through the hole. Furthermore, in the present exemplary embodiment, the first hole (315a), the second hole (315b) and the third hole (315c) all may be formed with a groove'.

The housing (310) may include a groove disposed on the connection part (311c). At this time, the groove may be extended from an outside of the housing (310) to at least one surface of the magnet (320). The housing (310) may be formed with a fourth hole (315d) passing through a portion of a corner surface of housing (310) and through a portion of the sixth coupling surface (312f). The fourth hole (315d) may be used to infuse an adhesive between the housing (310) and the first corner magnet (321). Thus, the fourth hole (315d) may be also called an "adhesive infuse hole".

The fourth coupling surface (312d) of housing (310) may be disposed with a groove (316) formed by allowing a portion of the fourth coupling surface (312d) to be recessed. The groove (316) may accommodate a portion of the adhesive disposed between the housing (310) and the second corner magnet (322). The magnet (320) may include a plurality of corner magnets, and at least four (4) surfaces of the corner magnet may be coupled to the housing (310) by an adhesive. At this time, the groove (316) may accommodate the adhesive by being disposed on an area corresponding to a portion of upper surface of corner magnet. The groove (316) may be distinguished from the first to fourth holes (315a, 315b, 315c, 315d) formed to infuse the adhesive.

A lug (313) may be coupled with the upper elastic member (510a, 510b). The lug (313) may be coupled with the external part (511a, 511b) of the upper elastic member (510a, 510b). The lug (313) may be so formed as to protrude from an upper surface of housing (310). For example, the lug (313) may be coupled by being inserted into a first coupling hole (511aa) of the external part (511a, 511b) of the upper elastic member (510a, 510b). At this time, the lug (313) may be fused while being inserted into the first coupling hole (511aa) of the external part (511a, 511b) to fix the upper elastic member (510a, 510b) between the fused lug (313) and an upper surface of housing (310).

A lower surface of housing (310) may be formed with a third groove (314) corresponding to the fourth coupling hole of the external part (521a) of the first lower elastic member (520a) and accommodating an adhesive. The third groove (314) may be formed by allowing a portion of a lower surface of housing (310) to be recessed. The third groove (314) may accommodate an adhesive. The third groove (314) may correspond to the fourth coupling hole of the external part (521a) of the lower elastic member (520a). The third groove (314) may be formed at a position corresponding to that of the fourth coupling hole of external part (521a). The third groove (314) may be formed with a shape corresponding to that of the fourth coupling hole of the external part (521a). The third groove (314) may be coupled with the first lower elastic member (520a). The third groove (314) may be coupled with the external part (521a) of the first lower elastic member (520a).

The housing (310) may be formed with a support part (317) supporting both distal ends of inner lateral surface of magnet (320) from an inside. The support part (317) may be protrusively formed on the housing (310). The support part (317) may support both distal ends of inner lateral surface of the magnet (320) from an inside. That is, the support part (317) may support an inner lateral surface of magnet (320) to prevent a phenomenon of the magnet (320) from being disengaged toward an inside of the housing (310).

The housing (310) may be formed with a fifth hole (318) spaced apart from the third hole (315c) by passing through the connection part (311c) to an optical axis direction. The third hole (315C) may be formed with a purpose of inserting an adhesive, and the fifth hole (318) may be formed with a purpose of thinning/slimming the product.

The housing (310) may include a recessed part (319) formed by allowing a portion of an upper surface of housing (310) to be recessed. The recessed part (319) may be formed by allowing a portion of the upper surface of housing (310) to be recessed. The recessed part (319) may be formed on a corner of the housing (310). A portion of the recessed part (319) may be overlapped with the coupling part (514a) to an optical axis direction. Through this structure, the recessed part (319) can accommodate a damper even if the damper (700) coated on the coupling part (514a) overflows.

A coupled structure of housing (310) with eight (8) corner magnets (321, 322, 323, 324, 325, 326, 327, 328) has been so far explained. However, an explanation on the first corner magnet (321) may be inferably applied to the fourth corner magnet (321), the fifth corner magnet (325) and the eighth corner magnet (328) which are relatively outwardly arranged. Furthermore, an explanation on the second corner magnet (322) may be inferably applied to the third corner magnet (323), the sixth corner magnet (326) and the seventh corner magnet (327) that are relatively outwardly arranged.

The magnet (320) may be disposed on the housing (310). The magnet (320) may be disposed at an outside of first and second coils (220a, 220b). The magnet (320) may face the first and second coils (220a, 220b). The magnet (320) may electromagnetically interact with the first and second coils (220a, 220b). The magnet (320) may be disposed at an upper side of a third coil (422). The magnet (320) may face the third coil (422). The magnet (320) may electromagnetically interact with the third coil (422). The magnet (320) may be commonly used for AF focus and OIS function. However, the magnet (320) may include a plurality of magnets separately and respectively used for AF function and the OIS function. The magnet (320) may be disposed on a corner portion of the housing (310). At this time, the magnet (320) may be a corner magnet. The magnet (320) may take a cubic shape having an inner lateral surface broader than an outer lateral surface. In a modification, the magnet (320) may be disposed on a side surface of housing (310). At this time, the magnet (320) may be a flat magnet. The magnet (320) may take a flat plate shape. The magnet (320) may include a plurality of flat plate magnets disposed at a lateral part of housing (310).

The magnet (320) may include a plurality of magnets each spaced apart from the other. The magnet (320) may include eight magnets, each spaced apart from the other. At this time, the said eight magnets may be so arranged as to allow adjacent two magnets to form a 90° relative to the housing (310). That is, the magnet (320) may be arranged on four corners of the housing (310) at an equidistant space. In this case, an efficient inner volumetric use of housing (310) can be promoted. Furthermore, the magnet (320) may be adhered to the housing (310) by an adhesive.

The magnet (320) may include a first magnet disposed at a side of the first bobbin (210a), and a second magnet disposed at a side of the second bobbin (210b). The magnet (320) may include a first magnet facing the first coil (220a), and a second magnet facing the second coil (220b). The second (315b) may include a first hole part extended from an outside of housing (310) to a first side surface of first magnet, and a second hole part extended from an outside of housing (310) to a first side surface of second magnet. At least one of the second hole (315b) and the third hole (315c) may be disposed with an adhesive coupling the magnet (320) to the housing (310). To be more specific, as illustrated in FIG. 20, an adhesive may be infused to A passage through the third hole (315c). Furthermore, an adhesive may be infused to B passage through the second hole (315b).

The housing (310) may include eight (8) corner parts formed on an area where four (4) side parts meet and on an area where the side parts and the connection part (311c) meet. The magnet (320) may include corner magnets each disposed on eight (8) corner parts of housing (310).

The magnet (320) may be formed by a plurality of corner magnets disposed on corners of housing (310). The plurality of corner magnets may include first to eighth magnets (321, 322, 323, 324, 325, 326, 327, 328) each spaced apart from the other. The plurality of corner magnets may be formed with first to eighth corner magnets (321, 322, 323, 324, 325, 326, 327, 328) each spaced apart from the other. That is, the magnet (320) may be formed with a total of eight magnets. The magnet (320) may be formed with eight magnets (321, 322, 323, 324, 325, 326, 327, 328) respectively disposed at positions corresponding to four first axis coil units and four second coil units.

The first to fourth corner magnets (321, 322, 323, 324) may be respectively disposed on corners of first bobbin reception part (311a). The fifth to eighth corner magnets (325, 326, 327, 328) may be respectively disposed on corners of second bobbin reception part (311b). The first to fourth corner magnets (321, 322, 323, 324) may be disposed on a side of first bobbin reception part (311a) of housing (310) to a counterclockwise direction as illustrated in FIG. 10. The fifth to eighth corner magnets (325, 326, 327, 328) may be disposed on a side of second bobbin reception part (311b) of housing (310) to a clockwise direction as illustrated in FIG. 10.

The first corner magnet (321) may be disposed at a more outer side than the second corner magnet (322) on the housing (310). The second corner magnet (322) may be disposed more inner side than the first corner magnet (321) on the housing (310). The second corner magnet (322) may be disposed nearer to a center of the housing (310) than the first corner magnet (321).

At least three lateral surfaces of the second corner magnet (322) may be coupled to the housing (310) by an adhesive. An upper surface of the second corner magnet (322) may be coupled to the housing (310) by an adhesive. An inner lateral surface of the second corner magnet (322) may be supported by the support part (317) of housing (310). Through this structure, a portion of inner lateral surface of the second corner magnet (322) may be opened inwardly. Furthermore, a lower surface of the second corner magnet (322) may be downwardly opened.

In the present exemplary embodiment of the present invention, at least four surfaces may be fixed by an adhesive in order to fix the magnet (320) to the housing (310). Three lateral surfaces of magnet (320) and an upper surface may be fixed to the housing (310) using an adhesive. In the exemplary embodiment of the present invention, a hole communicating with an outside may be disposed on a surface of the housing (310) adhered by the adhesive to the magnet (320). In the exemplary embodiment of the present invention, an adhesive may be infused through the said hole. Although explanations are focused on the second corner magnet (322) in the abovementioned exemplary embodiment of the present invention, a coupled structure of second corner magnet (322) relative to the housing (310) may be inferably applied to the coupled structure of the first to eighth corner magnets (321, 322, 323, 324, 325, 326, 327, 328) relative to the housing (310).

The stator (400) may be disposed at a lower side of housing (310). The stator (400) may be disposed at a lower side of OIS mover (300). The stator (400) may face the OIS mover (300). The stator (400) may movably support the OIS mover (300). The stator (400) may move the OIS mover (300). At this time, the AF mover (200a, 200b) may also be moved with the OIS mover (300).

The stator (400) may include a board (410), a circuit member (420) and a base (430). However, any one or more of the board (410), the circuit member (420) and the base (430) may be omitted or changed from the stator (400).

The board (410) may supply a power to the third coil (422). The board (410) may be coupled with the circuit member (420). The board (410) may be coupled to a PCB (10) disposed at a lower side of base (430). The board (410) may be disposed at a lower surface of circuit member (420). The board (410) may be disposed on an upper surface of base (430). The board (410) may be interposed between the circuit member (420) and the base (430). The board (410) may include a circuit member (420) having a third coil (422) so disposed as to face the magnet (320) between the housing (310) and the base (430). The board (410) may be coupled by a support member (600). At this time, a lower surface of board (410) and a lower end of support member (600) may be coupled by the soldering. The board (410) may be integrally formed.

The board (410) may include an FPCB (Flexible Printed Circuit Board). The board (410) may be partially bent. The board (410) may supply a power to the first and second coils (220a, 220b). The board (410) may supply a power to the first coil (220a) through the support member (600) and the first upper elastic member (510a). The board (410) may supply a power to the second coil (220b) through the support member (600) and the second upper elastic member (510b).

The board (410) may include a first opening (411a), a second opening (411b) and a terminal part (412). However, any one or more of the first opening (411a), the second opening (411b) and the terminal part (412) may be omitted or changed from the board (410).

The first opening (411a) may be formed on the board (410). The first opening (411a) may be formed by being leaned to one side of board (410). The first opening (411a) may be so formed as to pass through the board (410). The first opening (411a) may pass through a light having passed the first lens module. The first opening (411a) may be formed in a round shape. However, the shape of the first opening (411a) is not limited thereto. The first opening (411a) may be spaced apart from the second opening (411b).

The second opening (411b) may be formed on the board (410). The second opening (411b) may be formed by being leaned to one side of board (410). The second opening (411b) may be so formed as to pass through the board (410). The second opening (411b) may pass through a light having passed the first lens module. The second opening (411b) may be formed in a round shape. However, the shape of the second opening (411b) is not limited thereto. The second opening (411b) may be spaced apart from the first opening (411a).

The terminal part (412) may be disposed on the board (410). The terminal part (412) may be formed by allowing a portion of the board (410) to be downwardly bent. The terminal part (412) may be at least partially exposed to an outside. The terminal part (412) may be coupled to the PCB (10) disposed at a lower side of base (430) by way of soldering. A lower end of the terminal part (412) may directly contact the PCB (10). The terminal part (412) may be disposed on a terminal coupling part (434a, 434b) of base (430). The board (410) may include a terminal part (412) connected to an outside power source.

The terminal part (412) in the exemplary embodiment of the present invention may include a total of 16 terminals. Two terminals in the 16 terminals may be electrically connected to a first axis driving coil (423), two terminal may be electrically connected to a second axis driving coil (424), four terminals may be electrically connected to a first axis sensor (810), four terminals may be electrically connected to a second axis sensor (820), two terminals may be electrically connected to a first coil (220a), and two terminals may be electrically connected to a second coil (220b). Eight terminals in the 16 terminals may be extended from a first lateral surface of board (410), and remaining eight terminals may be extended from a second lateral surface disposed opposite to the first lateral surface.

For reference, in light of the fact that, in case of a single OIS module, two terminals are required on an AF coil, four terminals are required on an OIS coil (two terminals on the first axis driving coil and two terminals on the second axis driving coil), and eight terminals are required on a sensor (four terminals on the first axis sensor, and four terminals on the second axis sensor), a total of 14 terminals are required. Hence, a total of 28 terminals are required for a dual camera module where two single OIS modules are arranged in parallel. In view of the fact that only a total of 16 terminals are required in the realization of an OIS driving for a dual camera module in the first exemplary embodiment of the present invention, it may be regarded that 12 terminals are omitted over the foregoing comparative exemplary embodiment. Thus, the first exemplary embodiment of the present invention has an advantageous effect in that working processes may be simplified and obtainment of space for terminals and conductive line design can be advantaged.

As illustrated in FIG. 21, the terminal part (412) may be so disposed as to allow eight (8) terminals each on both sides of the board (410). The said eight terminals on one side may be disposed in the order of a first coil negative pole (AF 1-), a second coil negative pole (AF2-), a first axis coil negative pole (OISX-), a second axis coil negative pole (OISY-), a first axis sensor input positive pole (Hall X In+), a first axis sensor input negative pole (Hall X In-), a first axis sensor output positive pole (Hall X Out+) and a first axis sensor output negative pole (Hall X out-). The eight terminals on the other side may be disposed in the order of a first coil positive pole (AF1+), a second coil positive pole (AF2+), a first axis coil positive pole (OISX+), a second axis coil positive pole (OISY+), a second axis sensor input positive pole (Hall Y In+), a second axis sensor input negative pole (Hall Y In-), a second axis sensor output positive pole (Hall Y Out+) and a second axis sensor output negative pole (Hall Y out-).

The circuit member (420) may be disposed on the base (430). The circuit member (420) may be disposed on the board (410). The circuit member (420) may be disposed on an upper surface of board (410). The circuit member (420) may be disposed at a lower side of magnet (320). The circuit member (420) may be interposed between the magnet (320) and the base (430). The circuit member (420) may include a hole passing through the support member (600). A corner of the circuit member (420) may take a shape corresponding to that of the board (410) and may include a hole. Through this structure, the board (410) can be reinforced in terms of strength over a structure where a corner side of the circuit member (420) is omitted. The circuit member (420) may be integrally formed.

The circuit member (420) may include a board part (421) and a third coil (422). However, any one or more of the board part (421) and the third coil (422) may be omitted or changed from the circuit member (420).

The board part (421) may be a circuit board. The board part (421) may be an FPCB. The substrate part (421) may be integrally formed with a third coil (422). The board part (421) may be formed with a hole passed through by the support member (600). In a modification, the board part (421) may be coupled by the support member (600). At this time, a lower surface of board part (421) and a lower end of the support member (600) may be coupled by soldering. The board part (421) may be formed with an opening. The opening of the board part (421) may be formed to correspond to the opening (411a, 411b) of board (410).

The third coil (422) may face the magnet (320). In this case, when a current is supplied to the third coil (422) to form a magnetic field about the third coil (422), the magnet (320) may move to the third coil by the electromagnetic interaction between the third coil (422) and the magnet (320). The third coil (422) may electromagnetically interact with the magnet (320). The third coil (422) may move the housing (310) and the bobbin (210a, 210b) relative to the base (430) to a direction perpendicular to an optical axis through the electromagnetic interaction with the magnet (320). The third coil (422) may be an FP (Fine Pattern) coil integrally formed on the board part (421). The third coil (422) may be formed on the circuit member (420) with an FP coil. The third coil (422) may include a plurality of coils each spaced apart from the other.

The third coil (422) may include a first axis driving coil (423) moving the magnet (320) to a first axis direction, and a second axis driving coil (424) moving the magnet (320) to a second axis direction different from the first axis. The first axis may be perpendicular to the second axis. Each of the first axis and the second axis may be perpendicular to an optical axis of a lens coupled to the first bobbin (210a). Each of the first axis and the second axis may be perpendicular to an optical axis of lens coupled to the second bobbin (210b). Hereinafter, any one of an optical axis direction, a first axis direction and a second axis direction may be called a 'first direction' and another may be called a 'second direction' and still another may be called a 'third direction'.

The first axis coil (423) may include four first axis coil units each mutually spaced apart, and a connection coil connecting the four first axis coil units. At this time, the four first axis coil unit may be all electrically conducted through the connection coil. That is, the said four first axis coil units may be integrally controlled. However, the first axis driving coil (423) and the second axis driving coil (424) may be separately controlled. The first axis coils (423) may be integrally formed.

The second axis coil (424) may include four second axis coil units each mutually spaced apart, and a connection coil connecting the four second axis coil units. At this time, the four second axis coil unit may be all electrically conducted through the connection coil. That is, the said four second axis coil units may be integrally controlled. The second axis coils (423) may be integrally formed.

The base (430) may be disposed below the housing (310). The base (430) may be disposed at a lower surface of board (410). An upper surface of base (430) may be disposed with the board (410). The base (430) may be disposed with the circuit member (420). The base (430) may be coupled with the cover member (100). The base (430) may be disposed at an upper surface of PCB (10). However, a separate holder member (20) may be interposed between the base (430) and the PCB (10). The base (430) may perform a function of a sensor holder protecting an image sensor mounted on the PCB (10). The base (430) may be integrally formed.

The base (430) may include a hole (431a, 431b), a sensor coupling part (433), a terminal coupling part (434) and a staircase part (435). However, any one or more of the through hole (43 1a, 431b), the sensor coupling part (433), the terminal coupling part (434) and the staircase part (435) may be omitted or changed from the base (430).

The base (430) may include a first hole (431a) formed at a position corresponding to that of the first bobbin (210a), a second hole (431b) formed at a position corresponding to that of the second bobbin (210b), a recessed part (436) formed by allowing a portion of a lower surface of base (430) to be recessed, and a partition (437) protruded from a recessed surface of the recessed part (436) to a lower surface of base (430) between the first through hole (431a) and the second through hole (431b) and extended from a lateral surface of one side of base (430) to a lateral surface of other side of base (430).

The hole (431a, 431b) may be formed on the base (430). The hole (431a, 431b) may be so formed as to vertically pass through the base (430). The through hole (431a, 431b) may be formed with an infrared filter. However, the infrared filter may be coupled to a separate holder member (20) disposed at a lower surface of base (430). A light having passed the lens module through the through hole (431a, 431b) may be incident on the image sensor. The hole (431a, 431b) may include a first hole (431a) and a second hole (431b). The first hole (431a) may be passed through by a light having passed the first lens module. The second hole (431b) may be passed through by a light having passed the second lens module. The hole (431a, 431b) may take a circular shape. However, the shape of the hole (431a, 431b) is not limited thereto.

The sensor coupling part (433) may be disposed with a sensor (800). The sensor coupling part (433) may accommodate at least a portion of the sensor (800). The sensor coupling part (433) may be formed by a groove formed by allowing an upper surface of base (430) to be downwardly recessed. The sensor coupling part (433) may be formed by a plurality of grooves. For example, the sensor coupling part (433) may be formed with two grooves. At this time, each of the said two grooves may be disposed with a second sensor (800). The sensor coupling part (433) may include a first sensor coupling part (433a) and a second sensor coupling part (433b). The first sensor coupling part (433a) may be disposed with a first axis sensor (810). The second sensor coupling part (433b) may be disposed with a second axis sensor (820).

The terminal coupling part (434) may be disposed with a terminal part (412) of board (410). The terminal coupling part (434) may be formed by a groove formed by allowing a portion of a lateral surface of one side of the base (430) to be inwardly recessed. At this time, the terminal coupling part (434) may be surface-contacted by at least a portion of the terminal part (412) of board (410). A width of the terminal coupling part (434) may be correspondingly formed with that of the terminal part (412) of board (410). A length of the terminal coupling part (434) may be correspondingly formed with that of the terminal part (412) of board (410). The terminal coupling part (434) may be respectively disposed on both oppositely disposed lateral surfaces. The terminal coupling part (434) may include a first terminal coupling part (434a) formed at a lateral surface of one side of base (430), and a second terminal coupling part (434b) formed at a lateral surface of the other side of base (430). The first terminal coupling part (434a) may be formed on a lateral surface corresponding to a longer side of lateral surface of base (430) when viewed from an upper side of base (430). The first terminal coupling part (434a) may be formed at a center portion of a lateral surface of one side of base (430). The second terminal coupling part (434b) may take a shape corresponding to that of the first terminal coupling part (434a) at the opposite side of the first terminal coupling part (434a). The terminal coupling part (434) may be downwardly extended from a lower surface of the base (430). As a result, a lower end of the terminal coupling part (434) may be disposed on a side lower than a lower surface of the base (430).

The staircase part (435) may be formed at a lateral surface of base (430). The staircase part (435) may be formed by circumventing an outer periphery surface of base (430). The staircase part (435) may be formed by allowing an upper surface of the lateral surface of base (430) to be recessed. Alternatively, the staircase part (435) may be formed by allowing a lower surface of the lateral surface of base (430) to be protruded. The staircase part (435) may be disposed with a lower end of the side (lateral) plate (102) of the cover member (100).

The recessed part (436) may be formed by allowing a portion of a lower surface of base (430) to be recessed. The recessed surface formed by the recessed part (436) may be disposed at a position upper side than the base (430).

The partition (437) may be protrusively formed from the recessed surface of the recessed part (436) to a lower surface of base (430) between the first through hole (431a) and the second through hole (431b). The partition (437) may be extended from a lateral surface of one side of base (430) to a lateral surface of the other side. The partition (437) may reinforce the strength of base (430). The partition (437) may be doubly formed. In this case, the partition (437) may be more effective to the reinforcement of strength of base (430). The partition (437) may prevent a light supposed to be incident on the first image sensor from being incident onto the second image sensor by a space formed at a lower side of the base (430). Conversely, the partition (437) may prevent a light supposed to be incident on the second image sensor from being incident onto the first image sensor by a space formed at a lower side of the base (430). Two partitions (437) may be disposed each spaced apart to thereby form a space between the said two partitions (437).

Hereinafter, the elastic member (500a, 500b) and the support member (600) will be described as a configuration guiding the movement of the bobbin (210a, 210b) and the housing (310). However, the said description is only an example, and other members than a spring and a wire for guiding the movement of bobbin (210a, 210b) and the housing (310) may be used. For example, a ball guide may replace the elastic member (500a, 500b) and the support member (600).

The first elastic member (500a) may be coupled with the first bobbin (210a) and the housing (310). The first elastic member (500a) may elastically support the first bobbin (210a). The first elastic member (500a) may possess the elasticity on at least a portion thereof. The first elastic member (500a) may movably support the first bobbin (210a) relative to the housing (310) to an optical axis direction. That is, the first elastic member (500a) may support the first bobbin (210a) for AF driving. At this time, the first elastic member (500a) may be called an 'AF support member'.

The first elastic member (500a) may include a first upper elastic member (510a) and a first lower elastic member (520a). However, any one or more of the first upper elastic member (510a) and the first lower elastic member (520a) may be omitted or changed from the first elastic member (500a). The first upper elastic member (510a) and the first lower elastic member (520a) may be integrally formed.

The first upper elastic member (510a) may be disposed on an upper side of first bobbin (210a) and may be coupled with the first bobbin (210a) and the housing (310). The first upper elastic member (510a) may be disposed at an upper side of first bobbin (210a). The first upper elastic member (510a) may be coupled with the first bobbin (210a) and the housing (310). The first upper elastic member (510a) may be coupled to an upper surface of first bobbin (210a) and to an upper surface of housing (310). The first upper elastic member (510a) may elastically support the first bobbin (210a). The first upper elastic member (510a) may possess the elasticity on at least a portion thereof The first upper elastic member (510a) may movably support the first bobbin (210a). The first upper elastic member (510a) may movably move the first bobbin (210a) relative to the housing (310) to an optical axis direction. The first upper elastic member (510a) may be formed with a leaf spring.

Each of the first upper elastic members (510a) may be spaced apart from the other, and each may include first and second upper elastic units (510aa, 510ab) each connected to the first coil (220a). The first upper elastic unit (510aa) may be connected to one end of the first coil (220a). The second upper elastic unit (510ab) may be connected to the other end of first coil (220a). The first upper elastic unit (510aa) may be connected to a first wire (601). The second upper elastic unit (510ab) may be connected to a second wire (602). The first and second upper elastic units (510aa, 510ab) may be electrically connected to the first coil (220a). The first and second upper elastic units (510aa, 510ab) may be formed with an electrically conductive material. The first coil (220a) may receive a current through the first and second upper elastic units (510aa, 510ab).

The first upper elastic member (510a) may include a first external part (511a), a first internal part (512a), a first connection part (513a) and a coupling part (514a). However, any one or more of the first external part (511a), the first internal part (512a), the first connection part (513a) and the coupling part (514a) may be omitted or changed from the first upper elastic member (510a).

The first external part (511a) may be coupled with the housing (310). The first external part (511a) may be coupled to an upper surface of housing (310). The first external part (511a) may be coupled with a lug (313) of housing (310). The first external part (511a) may include a first coupling hole (511aa) coupled with the lug (313) of housing (310). The first coupling hole (511aa) of the first external part (511a) may be coupled by being fused with the lug (313) of the housing (310).

The first internal part (512a) may be coupled with the first bobbin (210a). The first internal part (512a) may be coupled to an upper surface of first bobbin (210a). The first internal part (512a) may be coupled to a first reception groove (213a) of first bobbin (210a) by an adhesive. The first internal part (512a) may include a second coupling hole (512aa) corresponding to the first reception groove (213a) of first bobbin (210a).

The first connection part (513a) may connect the first external part (511a) and the first internal part (512a). The first connection part (513a) may elastically connect the first external part (511a) and the first internal part (512a). The first connection part (513a) may possess the elasticity. At this time, the first connection part (513a) may be called an 'elastic part'. The first connection part (513a) may be formed by being bent more than twice.

The coupling part (514a) may be coupled with the support member (600). The coupling part (514a) may be coupled to the support member (600) by soldering. The coupling part (514a) may include a hole passed through by the support member (600). Through this structure, a portion having passed the coupling part (514a) on the support member (600) may be coupled by an upper surface of the coupling part (514a) by way of soldering. The coupling part (514a) may be extended from the first external part (511a). The coupling part (514a) may be extended from the first external part (511a) to an outside. The coupling part (514a) may include a bent part formed by being bent.

The coupling part (514a) may include a first extension part (5144aa) extended from the first external part (511a) to a corner side of housing (310), and a second extension part (514ab) extended from the first extension part (514aa) to a center direction of the first upper elastic member (510a). The first extension part (514aa) may be extended from the first external part (511a) to a corner side of housing (310). The second extension part (514ab) may be extended from the first extension part (514aa) to a center direction of the first upper elastic member (510a). The second extension part (514ab) may be extended from the first extension part (514aa) to a first external part (511a) direction of the first upper elastic member (510a). The first external part (511a) and the second extension part (514ab) may be spaced apart. However, the second extension part (514ab) and the first external part (511a) may be connected by a damper (700).

A distal end of the coupling part (514a) may be spaced apart from the first external part (511a). The damper (700) may connect a distal end of the coupling part (514a) with the first external part (511a). The expressions of "the first" and "the second" may be interchangeably used because these expressions are purported to make a mutual distinction among elements. For example, the first extension part (514aa) may be called a "second extension part", and the second extension part (514ab) may be called a "first extension part". Furthermore, although the first extension part (514aa) and the second extension part (514ab) are explained as elements of coupling part (514a), the coupling part (514a) may be interpreted as an element separate from the first extension part (514aa) and the second extension part (514ab). In this case, the coupling part (514a) may be meant to be an area coupled with the support member (1600) by being disposed between the first extension part (514aa) and the second extension part (514ab).

In the present exemplary embodiment, the upper elastic member (510a, 510b) may include an external part (511a, 511b) coupled to the housing (310), an internal part (512a, 512b) coupled to the bobbin (210a, 210b)), a connection part (513a, 513b) connecting the external part (511a, 511b) and the internal part (512a, 512b), a coupling part (514a, 514b) extended from the external part (511a, 511b) to be coupled with the support member (600), and a first extension part (see 514ab of FIG. 12) extended from the coupling part (514a, 514b) and spaced apart from the external part (51 la, 511b).

At this time, the damper (700) may connect a first extension part (514aa) and an external part (511a, 511b). The upper elastic member (510a, 510b) may include a second extension part (see 514aa of FIG. 12) extended from the external part (511a, 511b) to a corner side of housing (310) and connected to the coupling part (514a, 514b). The first extension part (514*aa*) may be extended from the coupling part (514*a*, 514*b*) to a center direction of the upper elastic member (510*a*, 510*b*). The first extension part (514*aa*) may include an area having a wider width toward a center direction of the upper elastic member (510*a*, 510*b*).

The first extension part (514*aa*) may be connected with the second extension part (514*ab*) through the coupling part (514*a*, 514*b*). The first extension part (514*aa*) may include an area having a curvature. An area facing an inner surface of the first extension part (514*aa*) on the lateral surface of the extension part (511*a*, 511*b*) may include an area corresponding to that of the inner surface of the first extension part (514*aa*). The inner surface of the first extension part (514*aa*) may include an area having a curvature. The housing (310) may include a groove part (319) formed by allowing a portion of an upper surface of housing (310) to be recessed. The portion of the groove part (319) may be overlapped with the coupling part (514*a*, 514*b*) to an optical axis direction. Furthermore, the groove part (319) may be spaced apart from the coupling part (514*a*, 514*b*).

The damper (700) in the exemplary embodiment of the present invention may be coated on the second extension part (514*ab*) and the first external part (511*a*). Through this structure, the resonance phenomenon generated on the elastic member (500*a*, 500*b*) and the support member (600) may be prevented. Furthermore, the said structure has an advantageous effect over a structure where the damper (700) is coated on the coupling part (514*a*) and the housing (310) or on the support member (600) and the housing (310) in that design is easy. This is because the first upper elastic member (510*a*) is relatively easy in design change and manufacturing compared with the housing (310). Meantime, an area contacted by the damper (700) can be maximized by forming the shape of the second extension part (514*ab*) and the first external part (511*a*) with a plurality of round parts in the first exemplary embodiment of the present invention. That is, the peculiar shape of the second extension part (514*ab*) and the first external part (511*a*) may prevent the damper (7000 from being disengaged in the first exemplary embodiment of the present invention.

The damper (700) in the present exemplary embodiment may be disposed of a total of four (4) pieces, two pieces on the first upper elastic member (510*a*), and two pieces on the second upper elastic member (510*b*). The damper (700) may be respectively disposed on four corners of the housing (310).

Although an additional damper is an element not shown in the first exemplary embodiment of the present invention, the additional damper may be coated in addition to the aforementioned damper (700). Particularly, the additional damper may be coated on the housing (310) and the support member (600). Furthermore, the additional damper may be coated on the housing (310) and the first and second upper elastic member (510*a*, 510*b*). Moreover, the support member (600) and the first and second upper elastic member (510*a*, 510*b*) may be also coated with damper.

Meantime, the exemplary embodiment of the present invention has been explained by focusing on the dual lens drive device or by using the dual lens drive device as a premise. However, the coated structure of the damper (700) in the exemplary embodiment is simply explained with a dual lens drive device as a premise for the convenience sake of explanation and it should be noted that the scope of right of the present invention is not limited to the dual lens drive device. The coated structure of damper (700) in the exemplary embodiment of the present invention may be applied not only on a dual lens drive device but also on a single lens drive device. The said single lens drive device may include a cover member (100), a first AF mover (200*a*), an OIS mover (300), a stator (400), a first elastic member (500*a*), a support member (600), a damper (700) and a sensor (800). The explanation on these elements may be inferably applied from the explanation on the exemplary embodiment of the present invention. That is, the first elastic member (500*a*) of the single lens drive device may be coated with a damper (700), and the explanation thereto may be inferably applied from the explanation of the exemplary embodiment of the present invention.

The second extension part (514*ab*) may be so formed as to have a broader width on at least a portion while being extended to a center direction of the first upper elastic member (510*a*). The second extension part (514*ab*) may include an area having a wider width while being extended to a center direction of the first upper elastic member (510*a*). An end of the second extension part (514*ab*) may be connected to the first extension part (514*aa*) and the other end may be formed with a free end. A distal end of the coupling part (514*a*) may be connected to the external part (511*a*) and the other end of the coupling part (514*a*) may be spaced apart from the external part (511*a*). The damper (700) may be integrally disposed on the other end of the coupling part (514*a*) and the external part (511*a*).

An inner surface of the other end of the second extension part (514*ab*) may include a curvature. The other end of the second extension part (514*ab*) may be formed with a curvature. An area facing an inner surface of the other end at the second extension part (514*ab*) on the lateral surface of the first external part (511*a*) may have a shape corresponding to a shape of the inner surface of the other end of the second extension part (514*ab*). An area facing the other end of the second extension part (514*ab*) on the first external part (511*a*) may have a shape corresponding to that of the second extension part (514*ab*). An inner surface of the other end of the second extension part (514*ab*) may include an area having a curvature.

A cross-sectional surface of the other end at the second extension part (514*ab*) may be formed to be round. Through the said structures, the damper (700) coated on the second extension part (514*ab*) may be prevented from being disengaged. That is, through the said structures, the damper (700) may be more securely fixed to the second extension part (514*ab*) and the first external part (511*a*).

The first lower elastic member (520*a*) may be disposed below the first bobbin (210*a*) to be coupled to the first bobbin (210*a*) and the housing (310). The first lower elastic member (520*a*) may be disposed below the first bobbin (210*a*). The first lower elastic member (520*a*) may be coupled to the first bobbin (210*a*) and the housing (310). The first lower elastic member (520*a*) may be coupled to a lower surface of first bobbin (210*a*) and to a lower surface of housing (310). The first lower elastic member (520*a*) may elastically support the first bobbin (210*a*). The first lower elastic member (520*a*) may possess the elasticity on at least a portion thereof The first lower elastic member (520*a*) may movably support the first bobbin (210*a*). The first lower elastic member (520*a*) may movably support the first bobbin (210*a*) relative to the housing (310) to an optical axis direction. The first lower elastic member (520*a*) may be formed with a leaf spring. The first lower elastic member (520*a*) may be integrally formed.

The first lower elastic member (520*a*) may include a second external part (521*a*), a second internal part (522*a*) and a second connection part (523*a*). However, any one or more of the second external part (521*a*), the second internal part (522*a*) and the second connection part (523*a*) may be omitted or changed from the first lower elastic member (520*a*).

The first lower elastic member (520*a*) may include a second external part (521*a*) coupled to the housing (310), a second internal part (522*a*) coupled to the first bobbin (210*a*) and a second connection part (523*a*) connecting the second internal part (522*a*) and the second external part (521*a*).

The second external part (521*a*) may be coupled with the housing (310). The second external part (521*a*) may be coupled to a lower surface of housing (310). The second external part (521*a*) may be coupled with a third reception groove (314) of housing (310) using an adhesive. The second external part (521*a*) may include a fourth coupling hole corresponding to the third reception groove (314) of housing (310).

The second internal part (522*a*) may be coupled to the first bobbin (210*a*). The second internal part (522*a*) may be coupled to a lower surface of first bobbin (210*a*). The second internal part (522*a*) may be coupled to a second groove (214*a*) of first bobbin (210*a*) using an adhesive. The second internal part (522*a*) may include a third coupling hole corresponding to the second groove (214*a*) of first bobbin (210*a*).

The second connection part (523*a*) may connect the second external part (521*a*) and the second internal part (522*a*). The second connection part (523*a*) may elastically connect the second external part (521*a*) and the second internal part (522*a*). The second connection part (523*a*) may possess the elasticity. At this time, the second connection part (523*a*) may be called an 'elastic part'. The second connection part (523*a*) may be formed by being bent more than twice.

The second elastic member (500*b*) may be coupled to the second bobbin (210*b*) and the housing (310). The second elastic member (500*b*) may elastically support the second bobbin (210*b*). The second elastic member (500*b*) may possess the elasticity on at least a portion thereof The second elastic member (500*b*) may movably move the second bobbin (210*b*). The second elastic member (500*b*) may movably support the second bobbin (210*b*) relative to the housing (310) to an optical axis direction. That is, the second elastic member (500*b*) may support the second bobbin (210*b*) so that the second bobbin (210*b*) can perform the AF driving. At this time, the second elastic member (500*b*) may be called an 'AF support member'.

The second elastic member (500*b*) may include a second upper elastic member (510*b*) and a second lower elastic member (520*b*). However, any one or more of the second upper elastic member (510*b*) and the second lower elastic member (520*b*) may be omitted or changed from the second elastic member (500*b*).

The second upper elastic member (510*b*) may be disposed on an upper side of second bobbin (210*b*) and may be coupled with the second bobbin (210*b*) and the housing (310). The second upper elastic member (510*b*) may be disposed at an upper side of second bobbin (210*b*). The second upper elastic member (510*b*) may be coupled with the second bobbin (210*b*) and the housing (310). The second upper elastic member (510*b*) may be coupled to an upper surface of the second bobbin (210*b*) and to an upper surface of the housing (310).

The second upper elastic member (510*b*) may elastically support the second bobbin (210*b*). The second upper elastic member (510*b*) may possess the elasticity on at least a portion thereof. The second upper elastic member (510*b*) may movably support the second bobbin (210*b*). The second upper elastic member (510*b*) may movably move the second bobbin (210*b*) relative to the housing (310) to an optical axis direction. The second upper elastic member (510*b*) may be formed with a leaf spring.

Each of the second upper elastic members (510*b*) may be spaced apart from the other, and each may include third and fourth upper elastic units (510*ba*, 510*bb*) each connected to the second coil (220*b*). The third upper elastic unit (510*ba*) may be connected to one end of the second coil (220*b*). The fourth upper elastic unit (510*bb*) may be connected to the other end of second coil (220*b*). The third upper elastic unit (510*ba*) may be connected to a third wire (603). The fourth upper elastic unit (510*bb*) may be connected to a fourth wire (604). The third and fourth upper elastic units (510*ba*, 510*bb*) may be electrically connected to the second coil (220*b*). The third and fourth upper elastic units (510*ba*, 510*bb*) may be formed with an electrically conductive material. The second coil (220*b*) may receive a current through the third and fourth upper elastic units (510*ba*, 510*bb*).

The second upper elastic member (510*b*) may include an external part (511*b*), an internal part (512*b*), a connection part (513*b*) and a coupling part (514*b*). However, any one or more of the external part (511*b*), the internal part (512*b*), the connection part (513*b*) and the coupling part (514*b*) may be omitted or changed from the first upper elastic member (510*a*).

The external part (511*b*) may be coupled with the housing (310). The external part (511*b*) may be coupled to an upper surface of housing (310). The external part (511*b*) may be coupled with a lug (313) of housing (310). The external part (511*b*) may include a first coupling hole coupled with the lug (313) of housing (310). The first coupling hole of the external part (511*b*) may be coupled by being fused with the lug (313) of the housing (310).

The internal part (512*b*) may be coupled with the second bobbin (210*b*). The internal part (512*b*) may be coupled to an upper surface of second bobbin (210*b*). The internal part (512*b*) may be coupled to an upper reception groove (213*b*) of second bobbin (210*b*) by an adhesive. The internal part (512*b*) may include a second coupling hole corresponding to the upper reception groove (213*b*) of second bobbin (210*b*).

The connection part (513*b*) may connect the external part (511*b*) and the internal part (512*b*). The connection part (513*b*) may elastically connect the external part (511*b*) and the internal part (512*b*). The connection part (513*b*) may possess the elasticity. At this time, the connection part (513*b*) may be called an 'elastic part'. The connection part (513*b*) may be formed by being bent more than twice.

The coupling part (514*b*) may be coupled with the support member (600). The coupling part (514*b*) may be coupled to the support member (600) by soldering. The coupling part (514*b*) may include a hole passed through by the support member (600). Through this structure, a portion having passed the coupling part (514*b*) on the support member (600) may be coupled by an upper surface of the coupling part (514*b*) by way of soldering. The coupling part (514*b*) may be extended from the external part (511*b*). The coupling part (514*b*) may be extended from the external part (511*b*) to an outside. The coupling part (514*b*) may include a bent part formed by being bent.

The coupling part (514*b*) may include a first extension part extended from the external part to a corner side of housing (310), and a second extension part extended from the first extension part to a center direction of the second upper elastic member (510*b*). The first extension part may be extended from the external part to a corner side of housing (310). The second extension part may be extended from the first extension part to a center direction of the second upper elastic member (510b). The second extension part may be extended from the first extension part to an external part (511b) direction of the second upper elastic member (510b). The external part (511b) and the second extension part may be spaced apart. However, the second extension part and the external part (511b) may be connected by a damper (700). That is, the damper (700) may be coated on the second extension part and the external part (511b). Through this structure, the resonance phenomenon generated from the elastic member (500a, 500b) and the support member (600) may be prevented. Furthermore, the said structure has an advantageous effect over a structure where the damper (700) is coated on the coupling part (514b) and the housing (310) or on the support member (600) and the housing (310) in that design is easy. This is because the second upper elastic member (510b) is relatively easy in design change and manufacturing compared with the housing (310).

The second lower elastic member (520b) may be disposed below the second bobbin (210b), and may be coupled to the second bobbin (210b) and the housing (310). The second lower elastic member (520b) may be disposed at a lower side of second bobbin (210b). The second lower elastic member (520b) may be coupled to the second bobbin (210b) and the housing (310). The second lower elastic member (520b) may be coupled to a lower surface of second bobbin (210b) and to a lower surface of housing (310). The second lower elastic member (520b) may elastically support the second bobbin (210b). The second lower elastic member (520b) may possess elasticity at least partially. The second lower elastic member (520b) may movably support the second bobbin (210b). The second lower elastic member (520b) may movably support the second bobbin (210b) relative to the housing (310) to an optical axis direction. The second lower elastic member (520b) may be formed with a leaf spring. The second lower elastic member (520b) may be integrally formed.

The second lower elastic member (520b) may include an external part (521b), an internal part (522b) and a connection part (523b). However, any one or more of the external part (521b), the internal part (522b) and the connection part (523b) may be omitted or changed from the second lower elastic member (520b).

The second lower elastic member (520b) may include an external part (521b) coupled to the housing (310), an internal part (522b) coupled to the second bobbin (210b) and a connection part (523b) connecting the internal part (522b) and the external part (521b).

The external part (521b) may be coupled with the housing (310). The external part (521b) may be coupled to a lower surface of housing (310). The external part (521b) may be coupled with a third groove (314) of housing (310) using an adhesive. The external part (521b) may include a fourth coupling hole corresponding to the third groove (314) of housing (310).

The internal part (522b) may be coupled to the second bobbin (210b). The internal part (522b) may be coupled to a lower surface of the second bobbin (210b). The internal part (522b) may be coupled to a lower groove (214b) of the second bobbin (210b) using an adhesive. The internal part (522b) may include a third coupling hole corresponding to the lower groove (214b) of the second bobbin (210b).

The connection part (523b) may connect the external part (521b) and the internal part (522b). The connection part (523b) may elastically connect the external part (521b) and the internal part (522b). The connection part (523b) may possess the elasticity. At this time, the connection part (523b) may be called an 'elastic part'. The connection part (523b) may be formed by being bent more than twice.

The first coupling hole (511aa) of the first external part (511a) at the first upper elastic member (510a) according to the exemplary embodiment of the present invention may be coupled by being fused to a lug (313) of the housing (310). Furthermore, the first internal part (512a), the second external part (521a) and the second internal part (522a) may be coupled to the housing (310) and the first bobbin (210a) using an adhesive. That is, one area out of two areas coupled by the first upper elastic member (510a) with the housing (310) and two areas coupled by the first upper elastic member (510a) with the first bobbin (210a) may be coupled by fused coupling between a lug and a hole, and the remaining three areas may be coupled by allowing an adhesive to be coated on a coupling hole.

In the exemplary embodiment of the present invention, in light of the fact that a mutual optical axis alignment between the first bobbin (210a) and the second bobbin (210b) is important, only one area is coupled by fusion among the four coupled areas and the remaining three areas are coupled by using an adhesive, as mentioned above. Thus, in the first exemplary embodiment of the present invention, a phenomenon of the first bobbin (210a) and the second bobbin (210b) being mis-aligned may be prevented due to generation of tilt in the process of the first elastic member (500a) being coupled to the first bobbin (210a). Conversely, in the first exemplary embodiment of the present invention, a phenomenon of the first bobbin (210a) and the second bobbin (210b) being mis-aligned may be prevented due to generation of tilt in the process of the second elastic member (500b) being coupled to the second bobbin (210b).

In a modification, the lug (313) of housing (310) and the third reception groove (314) of housing (310) may be reversely formed. That is, the lug (313) may be formed at a lower surface of housing (310), and the third reception groove (314) may be formed at an upper surface of housing (310). In the exemplary embodiment of the present invention, the first upper elastic member (510a) is first fixed to an upper surface of housing (310), and then, the first bobbin (210a) is inserted into a lower side of housing (310) to allow the first bobbin (210a) and the first upper elastic member (510a) to be coupled. However, in the modification, the first lower elastic member (520a) is first fixed to a lower surface of housing (310) and then, the first bobbin (210a) is inserted at an upper side of housing (310) to allow the first bobbin (210a) and the first lower elastic member (520a) to be coupled.

The support member (600) may movably support the housing (310). The support member (600) may elastically support the housing (310). The support member (600) may possess the elasticity at least on a portion thereof For example, the support member (600) may movably support the housing (310) relative to the stator (400) to a direction perpendicular to an optical axis. At this time, the bobbin (210a, 210b) may integrally move along with the housing (310). In another example, the support member (600) may tiltably support the housing (310) relative to the stator (400). That is, the support member (600) may support to allow the housing (310) and the bobbin (210a, 210b) to perform an OIS driving. At this time, the support member (600) may be called an 'OIS support member'. For example, the support member (600) may be formed with a wire. In another example, the support member (600) may be formed with a leaf spring.

The support member (600) may be connected to the first upper elastic member (500a) and the board (410). The support member (600) may be connected to the second upper elastic member (500b) and the board (410). The support member (600) may be coupled to the upper elastic member (510a, 510b) and the stator (400). A lower end of the support member (600) may be coupled to the board (410). The support member (600) may pass through the board (410). Through the said structure, a lower end of the support member (600) may be coupled to a lower surface of board (410) by way of soldering. An upper end of the support member (600) may be coupled to the coupling part (514a, 514b) of upper elastic member (510a, 510b). The upper end of the support member (600) may pass through the coupling part (514a, 514b) of upper elastic member (510a, 510b). In the said structure, the upper end of the support member (600) may be coupled to an upper surface of the coupling part (514a, 514b) of upper elastic member (510a, 510b) by way of soldering. In a modification, a lower end of the support member (600) may be coupled to a board part (421) of circuit member (420). The lower end of the support member (600) may be coupled to the base (430). The upper end of the support member (600) may be coupled to the housing (310). The said structure of support member (600) is not limited thereto, and any structure capable of movably supporting the OIS mover (300) to the stator may be provided. The support member (600) may be coupled to a second extension part (514ab). The support member (600) may include four (4) support parts. Each of the support parts may be a wire. A lower end of wire may be soldered to a lower surface of board (410). An upper end of wire may be soldered to the coupling part (514a).

The support member (600) may include a first support member connected to the first upper elastic member (510a) and the board (410), and a second support member connected to the second upper elastic member (510b) and the board (410). The first support member may include a first wire (601) and a second wire (602), each space apart from the other. The second support member may include a third wire (603) and a fourth wire (604), each spaced apart from the other.

The support member (600) may be formed with a plurality of divisive elements. The support member (600) may be formed with four (4) support parts, each spaced apart from the other. At this time, the support part may be a wire. The support member (600) may be formed with four wires (601, 602, 603, 604), each wire spaced apart from the other wire. The support member (600) may be formed with first to fourth wires (601, 602, 603, 604), each wire spaced apart from the other wire. The support member (600) may include first to fourth wires (601, 602, 603, 604), each wire spaced apart from the other wire. The support member (600) may be comprised of first to fourth wires (601, 602, 603, 604), each wire spaced apart from the other wire. That is, the support member (600) may be formed with a total of four (4) wires. In particular, the support member (600) may be formed with first to fourth wires (601, 602, 603, 604) each paired with the first to fourth upper elastic units (510aa, 510ab, 510ba, 510bb).

The first wire (601) may be connected to the first upper elastic unit (510aa). The second wire (602) may be connected to the second upper elastic unit (510ab). The third wire (603) may be connected to the third upper elastic unit (510ba). The fourth wire (604) may be connected to the fourth upper elastic unit (510bb).

The damper (700) may be formed with a material having viscosity. The damper (700) may be coated on the external part (511a) and the coupling part (514a). The damper (700) may be coated on the second extension part (514ab) and the first external part (511a). Through this structure, the resonance phenomenon generated from the elastic member (500a, 500b) and the support member (600) may be prevented. To be more specific, through the said structure, a phenomenon of oscillation generated from intrinsic resonance frequency of elastic member (500a, 500b) and the support member (600) may be prevented. Furthermore, the said structure has an advantageous effect of easy design over a structure where the damper (700) is coated on the coupling part (514a) and the housing (310) or to the support member (600) and the housing (310). This is because the first upper elastic member (510a) is relatively easy in design change and simple in manufacturing compared with the housing (310).

The sensor (800) may be coupled to the board (410). The sensor (800) may detect the magnet (320). The sensor (800) may be accommodated into the sensor coupling part (433) of base (430). The sensor (800) may be provided for OIS feedback. In this case, the sensor (800) may be called an 'OIS feedback sensor'. The sensor (800) may detect the movement of housing (310). The sensor (800) may detect the movement or tilt of the housing (310) and/or the bobbin (210a, 210b) to a direction perpendicular to an optical axis. The sensor (800) may detect the magnet (320). The sensor (800) may detect the magnet (320) disposed on the housing (310). The sensor (800) may detect the position of housing (310). The sensor (800) may detect an amount of movement of the housing (310) to a direction perpendicular to an optical axis. At this time, the amount of movement of housing (310) to a direction perpendicular to the optical axis may correspond to that of the bobbin (210a, 210b) and to that of the lens module coupled to the bobbin (210a, 210b). The sensor (800) may be disposed on the stator (400). The sensor (800) may be disposed on a lower surface of board (410). The sensor (800) may be electrically connected to the board (410). The sensor (800) may be disposed on the base (430). The sensor (800) may be accommodated into the sensor coupling part (433) formed on an upper surface of base (430). The sensor (800) may be a Hall sensor. The sensor (800) may be a Hall IC (Hall integrated circuit). The sensor (800) may detect a magnetic force of magnet (320). That is, the sensor (800) may detect the change in the magnetic force of magnet (320) when the housing (310) is moved to detect the displacement quantity of the housing (310). The sensor (800) may be provided in a plural number. For example, the sensor (800) may be provided in two pieces to detect the x axis and y axis (optical axis is z axis) movement of housing (310). The sensor (800) may include a first axis sensor (810) detecting the movement to a first axis direction of the magnet (320) and a second axis sensor (820) detecting the movement to a second axis direction of the magnet (320). At this time, the first axis and the second axis may be mutually perpendicular. Furthermore, the first axis and the second axis may be perpendicular to an optical axis.

Hereinafter, an operation of dual camera module according to the exemplary embodiment of the present invention will be described.

When a power is supplied to the first coil (220a), the first coil (220a) performs a movement relative to the magnet (320) in response to an electromagnetic interaction between the first coil (220a) and the magnet (320). At this time, the first bobbin (210a) coupled to the first coil (220a) integrally moves along with the first coil (220a). That is, the first bobbin (210a) coupled by the first lens module moves to the housing (310) to an optical axis direction. This movement of first bobbin (210a) may result in the first lens module closing on or distancing from the first image sensor, such that the focus control to a subject can be performed by supplying a power to the first coil (220a) according to the exemplary embodiment of the present invention. Meantime, the said focus control may be automatically implemented in response to a distance to a subject.

Likewise, when a power is supplied to the second coil (220b), the second coil (220b) performs a movement relative to the magnet (320) in response to an electromagnetic interaction between the second coil (220b) and the magnet (320). At this time, the second bobbin (210b) coupled to the second coil (220b) integrally moves along with the second coil (220b). That is, the second bobbin (210b) coupled by the second lens module moves to the housing (310) to an optical axis direction. This movement of second bobbin (210b) may result in the second lens module closing on or distancing from the second image sensor, such that the focus control to a subject can be performed by supplying a power to the second coil (220b) according to the first exemplary embodiment of the present invention. Meantime, the said focus control may be automatically implemented in response to a distance to a subject.

In the exemplary embodiment of the present invention, a current supply to the first and second coils (220a, 220b) is separately controlled such that the AF driving for the first and second lens modules may be separately controlled.

Now, the OIS function of the dual camera module will be described according to the exemplary embodiment of the present invention.

When a power is supplied to the third coil (422), the magnet (320) is moved to the third coil (422) in response to the electromagnetic interaction between the third coil (422) and the magnet (320). At this time, the housing (310) coupled with the magnet (320) is integrally moved along with the magnet (320). That is, the housing (310) is moved to the base (430) to a horizontal direction (direction perpendicular to an optical axis). However, at this time, the housing (310) may be induced to be tilted to the base (430). Meantime, the bobbin (210a, 210b) may be integrally moved along with the housing (310) in response to the horizontally-directed movement of the housing (310). Hence, the said movement of the housing (310) may result in the lens module coupled with the bobbin (210a, 210b) moving to a direction parallel with a direction disposed with the image sensor relative to the image sensor. That is, in the exemplary embodiment of the present invention, the supply of power to the third coil (422) may enable to perform the OIS function.

Meantime, in order to implement a more accurate realization of OIS function by the dual lens module according to the exemplary embodiment of the present invention, an OIS feedback function may be performed. The sensor (800) disposed on the base (430) may detect the magnetic field of the magnet (320) disposed on the housing (310). As a result, when the housing (310) performs a relative movement to the base (430), the amount of magnetic field detected by the sensor (800) may be changed. The first axis sensor (810) and the second axis sensor (820) detects the amount of movement or position of the housing (310) to a horizontal direction (x axis and y axis directions) using the foregoing method, and transmits a detected value to the controller. The controller may determine whether to perform an additional movement to the housing (310) using the received value. The said processes are generated in real time to allow the OIS function of the camera module according to the exemplary embodiment of the present invention to be more accurately performed through the OIS feedback control.

Hereinafter, the configuration of dual camera module according to a modification of the exemplary embodiment of the present invention will be described with reference to the accompanying drawings.

FIG. 13 is a conceptual view illustrating a modification of the exemplary embodiment of the present invention.

The dual camera module according to the modification may be different from the dual camera module according the aforementioned exemplary embodiment of the present invention in that there is a difference in the disposition of magnet (320). Thus, hereinafter, the difference will be focused on explanation between the two exemplary embodiments, and other remaining configurations may be inferred from the explanation of the exemplary embodiment of the present invention.

The magnet (320) in the modification may be disposed on a lateral surface of housing (310). This is different from the exemplary embodiment of the present invention in that the magnet (320) is disposed at a corner side of the housing (310). Meantime, the magnet (320) in the modification may be formed with seven (7) pieces. This is different from the first exemplary embodiment of the present invention where the magnet (320) is to be disposed with eight (8) corner magnets. In particular, the application of seven magnets (320) in the modification may allow the magnet (320) disposed between the first and second bobbins (210a, 210b) to be commonly used in the AF driving of the first and second bobbins (210a, 210b). Meantime, arrangement of N pole and S pole may be different in order to apply the seven magnets (320) in the modification. The magnet (320) facing the first bobbin (210a) may allow the N pole to face the first bobbin (210a). Furthermore, the magnet (320) facing the second bobbin (210b) may allow the S pole to face the second bobbin (210b). Of course, the arrangement of N pole and S pole of magnet (320) may be also reversely disposed from the previous explanation. The said arrangement structure of magnet (320) will be explained in more details hereinafter.

The magnet (320) in the modification may be disposed on a lateral surface of housing (310). This is different from the exemplary embodiment of the present invention in that the magnet (320) is disposed at a corner side of the housing (310). Meantime, the magnet (320) in the modification may be formed with seven (7) pieces. This is different from the first exemplary embodiment of the present invention where the magnet (320) is to be disposed with eight (8) corner magnets. In particular, the application of seven magnets (320) in the modification may allow the magnet (320) disposed between the first and second bobbins (210a, 210b) to be commonly used in the AF driving of the first and second bobbins (210a, 210b). Meantime, arrangement of N pole and S pole may be different in order to apply the seven magnets (320) in the modification. The magnet (320) facing the first bobbin (210a) may allow the N pole to face the first bobbin (210a). Furthermore, the magnet (320) facing the second bobbin (210b) may allow the S pole to face the second bobbin (210b). Of course, the arrangement of N pole and S pole of magnet (320) may be also reversely disposed from the previous explanation.

Although the present disclosure has been explained with all constituent elements forming the exemplary embodiments of the present disclosure being combined in one embodiment, or being operated in one embodiment, the present disclosure is not limited thereto. That is, all elements may operate by allowing one or more elements to be selectively combined as long as within the scope of object of the invention. Furthermore, terms such as "includes", "including", "have", "having", "comprises" and/or "comprising" as used herein mean that the relevant elements are embedded, unless otherwise described, such that the mentioned elements are not excluded but may be further included.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. The foregoing explanations are intended only to be illustrative of the technical ideas of the present invention, and therefore, it should be appreciated by the skilled in the art that various modifications and amendments to the above examples may be made without deviating from the scope of protection of the invention.

The exemplary embodiments disclosed by the present invention are not to limit the technical ideas of the present invention but to explain the present invention, and therefore, the technical ideas of present invention are not to be limited by the exemplary embodiments. The scope of protection of the present invention should be interpreted by the following claims and all technical ideas within the equivalent scope should be interpreted as being included in the scope of right of the present invention.

The invention claimed is:

1. A lens driving apparatus comprising:
   a housing;
   a bobbin disposed in the housing;
   a coil disposed on the bobbin;
   a magnet disposed on the housing and facing the coil;
   a base disposed below the housing;
   a substrate disposed between the housing and the base;
   an elastic member disposed on the bobbin and coupled to the bobbin and the housing; and
   a support member coupled to the housing and the substrate,
   wherein a hall sensor is disposed on the base,
   wherein the elastic member comprises an external part coupled to the housing, an internal part coupled to the bobbin, a connection part connecting the external part and the internal part,
   wherein the bobbin comprises a groove formed on the one surface of the bobbin,
   wherein the internal part of the elastic member comprises a coupling hole,
   wherein the coupling hole of the internal part comprises a first area formed at a position corresponding to the groove of the bobbin, and a second area extending from the first area, and
   wherein an adhesive for fixing the elastic member to the one surface of the bobbin is disposed in the coupling hole of the internal part.

2. The lens driving apparatus of claim 1, wherein the first area of the coupling hole is formed in a circular shape having a first diameter, and
   wherein the second area of the coupling hole extends in one direction with a second width smaller than the first diameter.

3. The lens driving apparatus of claim 1, wherein the first area of the coupling hole and the second area of the coupling hole are formed in different shapes from each other.

4. The lens driving apparatus of claim 1, wherein the elastic member comprises an upper elastic member coupled to an upper surface of the bobbin and a lower elastic member coupled to a lower surface of the bobbin,
   wherein the support member coupled to the upper elastic member and the substrate, and
   wherein a damper is disposed on the upper elastic member.

5. The lens driving apparatus of claim 4, wherein the upper elastic member comprises a coupling part coupled to the support member and a first extension part extending from the coupling part in the central direction of the upper elastic member and facing the external part, and
   wherein one surface facing the external part in the first extension part comprises a curved surface.

6. The lens driving apparatus of claim 5, wherein the first extension part comprises a portion having a wider width as it extends toward the center of the upper elastic member.

7. The lens driving apparatus of claim 5, wherein one surface facing the first extension in the external part of the upper elastic member comprises at least one bent surface.

8. The lens driving apparatus of claim 5, wherein the damper disposed between the first extension part and the external part.

9. The lens driving apparatus of claim 5, wherein the upper elastic member comprises a second extension part extending from the external part to the corner side of the housing and connected to the coupling part.

10. The lens driving apparatus of claim 9, wherein the coupling part, the first extension part, and the second extension part of the upper elastic member overlap the upper surface of the housing in an optical axis direction, and
    wherein at least one of the coupling part, the first extension part, and the second extension part is spaced apart from the upper surface of the housing.

11. The lens driving apparatus of claim 5, wherein the first extension part is connected to the second extension part through the coupling part.

12. The lens driving apparatus of claim 5, wherein a portion of a side surfaces of the external part that faces an inner surface of the first extension part comprises a shape corresponding to a shape of the inner surface of the first extension part.

13. The lens driving apparatus of claim 5, wherein an inner surface of the first extension part comprises a portion having a curvature.

14. The lens driving apparatus of claim 5, wherein the housing comprises a groove part in which a part of the upper surface of the housing is recessed, and
    wherein a portion of the groove part overlaps the coupling part in an optical axis direction, and the groove part is spaced apart from the coupling part.

15. The lens driving apparatus of claim 1, wherein the bobbin comprises a first bobbin and the second bobbin spaced apart from the first bobbin,
    wherein the coil comprises a first coil disposed on the first bobbin, a second coil disposed on the second bobbin, and a third coil facing the magnet disposed on the substrate, and
    wherein each of the housing, the base, and the substrate is integrally formed.

16. The lens driving apparatus of claim 1, wherein the support member comprises a wire, and wherein a lower end of the wire is soldered to a lower surface of the substrate, and an upper end of the wire is soldered to the coupling part.

17. A camera, comprising:
the lens driving apparatus of claim 1;
a lens coupled to the bobbin of the voice coil motor; and
an image sensor disposed at a position corresponding to the lens.

18. A dual lens driving apparatus comprising:
a housing;
a first bobbin disposed in the housing;
a second bobbin disposed in the housing and spaced apart from the first bobbin;
a first coil disposed on the first bobbin;
a second coil disposed on the second bobbin;
a magnet disposed on the housing and facing the first coil and the second coil;
a base disposed below the housing;
a substrate comprising a circuit member having a third coil disposed between the housing and the base to face the magnet; and
a support member movably supporting the housing with respect to the substrate,
wherein a hall sensor is disposed on the base,
wherein the elastic member comprises an external part coupled to the housing, an internal part coupled to the bobbin, a connection part connecting the external part and the internal part,
wherein the bobbin comprises a groove formed on the one surface of the bobbin,
wherein the internal part of the elastic member comprises a coupling hole,
wherein the coupling hole of the internal part comprises a first area formed at a position corresponding to the groove of the bobbin, and a second area extending from the first area, and
wherein an adhesive for fixing the elastic member to the one surface of the bobbin is disposed in the coupling hole of the internal part.

19. The dual lens driving apparatus of claim 18, wherein the first area of the coupling hole is formed in a circular shape having a first diameter, and
wherein the second area of the coupling hole extends in one direction with a second width smaller than the first diameter.

* * * * *